United States Patent
Savage-Leuchs

(10) Patent No.: US 9,431,786 B2
(45) Date of Patent: Aug. 30, 2016

(54) SYSTEM AND METHOD FOR A DELIVERY FIBER FOR ISOLATION AGAINST BACK REFLECTIONS

(71) Applicant: Lockheed Martin Corporation, Bethesda, MD (US)

(72) Inventor: Matthias P. Savage-Leuchs, Woodinville, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 214 days.

(21) Appl. No.: 14/288,077

(22) Filed: May 27, 2014

(65) Prior Publication Data

US 2016/0104995 A1 Apr. 14, 2016

Related U.S. Application Data

(62) Division of application No. 13/085,354, filed on Apr. 12, 2011, now Pat. No. 8,736,953.

(60) Provisional application No. 61/343,947, filed on Apr. 12, 2010, provisional application No. 61/343,945, (Continued)

(51) Int. Cl.
  *H01S 3/00* (2006.01)
  *H01S 3/067* (2006.01)
  (Continued)

(52) U.S. Cl.
  CPC ......... *H01S 3/0064* (2013.01); *G02B 6/02366* (2013.01); *G02B 6/32* (2013.01); *H01S 3/06783* (2013.01); *H01S 3/10015* (2013.01)

(58) Field of Classification Search
  CPC .... H01S 3/0064; H01S 3/06783; G02B 6/32

USPC .......................................................... 359/337
See application file for complete search history.

(56) References Cited

U.S. PATENT DOCUMENTS

| 5,907,652 A | 5/1999 | Digiovanni et al. |
| 6,456,756 B1 | 9/2002 | Mead |

(Continued)

OTHER PUBLICATIONS

Hayes, et al., "Square Core Jacketed Air-clad Fiber", "Optics Express", Oct. 30, 2006, pp. 10345-10350, vol. 14, No. 22.
(Continued)

*Primary Examiner* — Mark Hellner
(74) *Attorney, Agent, or Firm* — Charles A. Lemaire; Jonathan M. Rixen; Lemaire Patent Law Firm, P.L.L.C.

(57) ABSTRACT

An apparatus and method that provide optical isolation by permitting substantially all forward-propagating light into a delivery fiber from an optical amplifier and substantially preventing backward-traveling light from the delivery fiber entering the optical amplifier without the use of a conventional optical isolator. Eliminating the isolator improves efficiency and reduces cost. Some embodiments use a delivery fiber having a non-circular core in order to spread a single-mode signal into multiple modes such that any backward-propagating reflection is inhibited from reentering the single-mode amplifier. Some embodiments amplify an optical signal in a gain fiber having an output end, output the forward-propagating amplified signal as a high-brightness optical beam (having a first Rayleigh range) into a removable delivery fiber having a non-circular waveguide, output the amplified signal from a distal end of the delivery fiber, and, without the use of a non-linear optical isolator, inhibit backward-propagating light from re-entering the gain fiber.

20 Claims, 14 Drawing Sheets

Related U.S. Application Data filed on Apr. 12, 2010, provisional application No. 61/343,946, filed on Apr. 12, 2010, provisional application No. 61/343,948, filed on Apr. 12, 2010, provisional application No. 61/343,949, filed on Apr. 12, 2010.

(51) Int. Cl.
  *G02B 6/32* (2006.01)
  *G02B 6/02* (2006.01)
  *H01S 3/10* (2006.01)

(56) References Cited

U.S. PATENT DOCUMENTS

| | | | |
|---|---|---|---|
| 6,792,193 B2 * | 9/2004 | Maestle | G02B 6/4207 372/36 |
| 6,987,783 B2 | 1/2006 | Fajardo et al. | |
| 7,199,924 B1 | 4/2007 | Brown et al. | |
| 7,379,648 B1 | 5/2008 | Brooks et al. | |
| 7,386,211 B1 | 6/2008 | Di Teodoro et al. | |
| 7,391,561 B2 | 6/2008 | Di Teodoro et al. | |
| 7,400,804 B1 | 7/2008 | Di Teodoro et al. | |
| 7,429,734 B1 | 9/2008 | Tidwell | |
| 7,430,352 B2 | 9/2008 | Di Teodoro et al. | |
| 7,471,705 B2 | 12/2008 | Gerstenberger et al. | |
| 7,539,231 B1 | 5/2009 | Honea et al. | |
| 7,576,909 B2 | 8/2009 | Harter et al. | |
| 7,590,323 B2 | 9/2009 | Broeng et al. | |
| 7,620,077 B2 | 11/2009 | Henderson | |
| 7,676,125 B2 | 3/2010 | Zheng | |
| 7,701,987 B1 | 4/2010 | Savage-Leuchs et al. | |
| 7,768,700 B1 | 8/2010 | Savage-Leuchs | |
| 7,792,166 B2 | 9/2010 | Borschowa | |
| 7,835,068 B1 | 11/2010 | Brooks et al. | |
| 7,872,794 B1 | 1/2011 | Minelly et al. | |
| 8,285,099 B2 | 10/2012 | Dong | |
| 9,225,138 B2 * | 12/2015 | Nagano | H01S 3/02 |
| 2003/0231845 A1 | 12/2003 | Patlakh et al. | |
| 2006/0104582 A1 | 5/2006 | Frampton et al. | |
| 2008/0077200 A1 | 3/2008 | Bendett et al. | |
| 2012/0152918 A1 * | 6/2012 | Li | B23K 26/0656 219/121.75 |

OTHER PUBLICATIONS

Limpert, et al., "High-power Air-clad Large-mode-area Photonic Crystal Fiber Laser", "Optics Express", Apr. 7, 2003, pp. 818-823, vol. 11, No. 7.

* cited by examiner

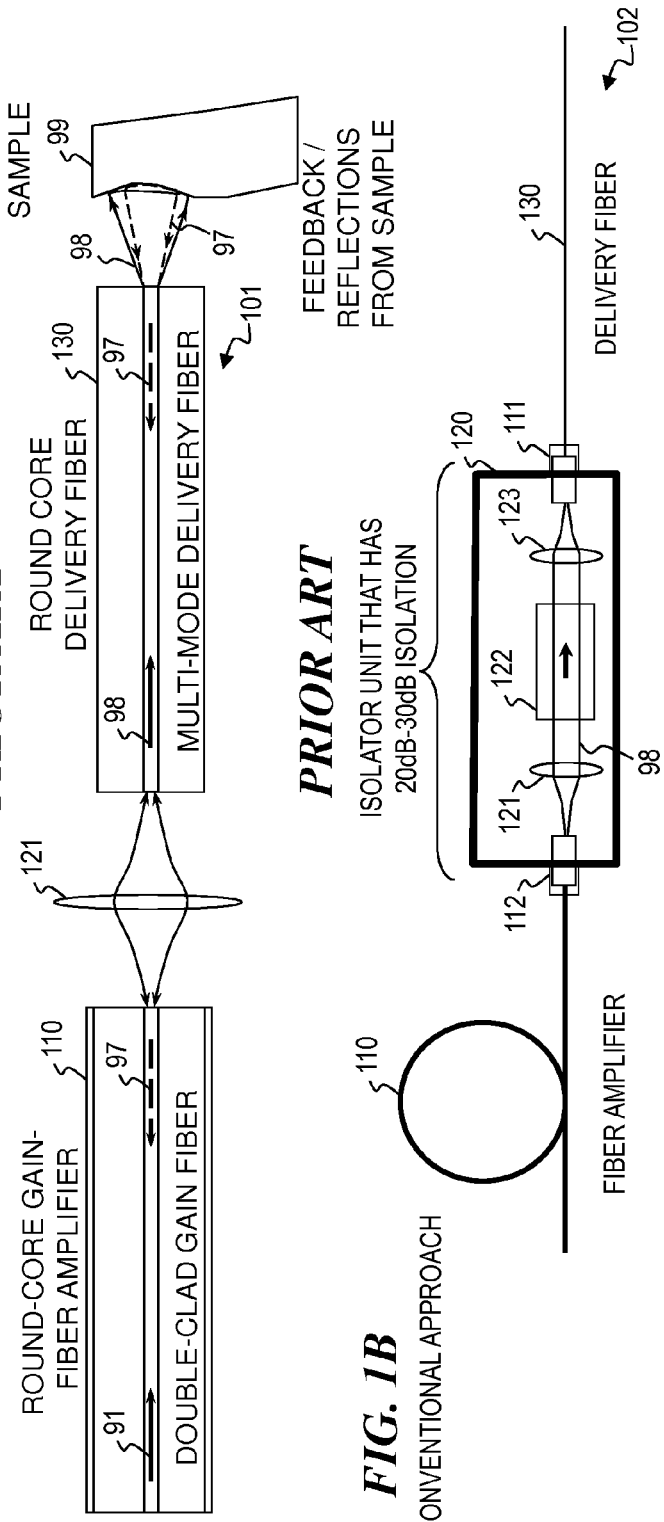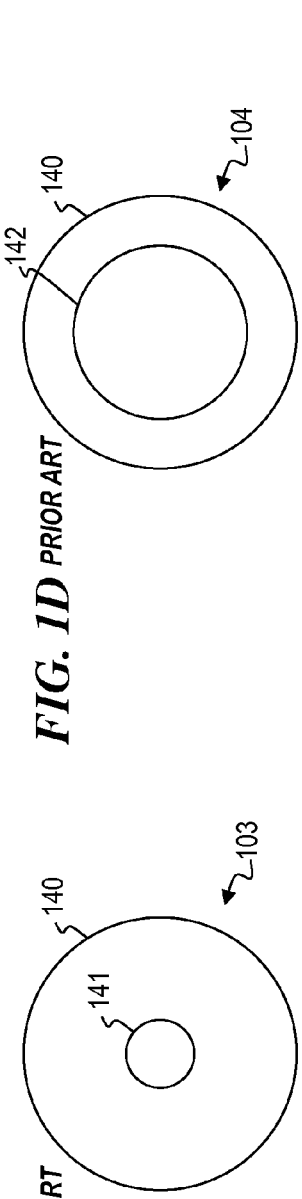

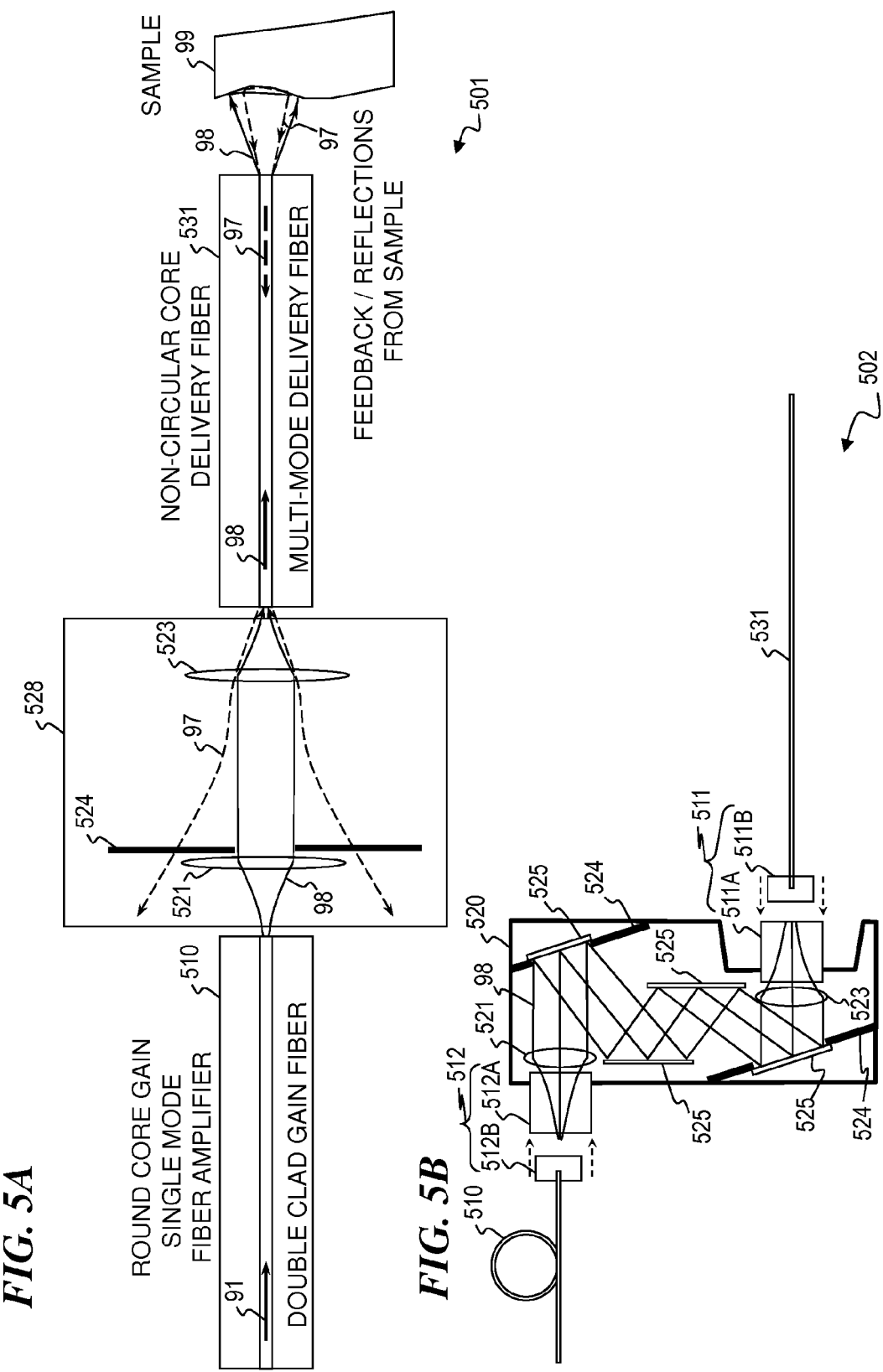

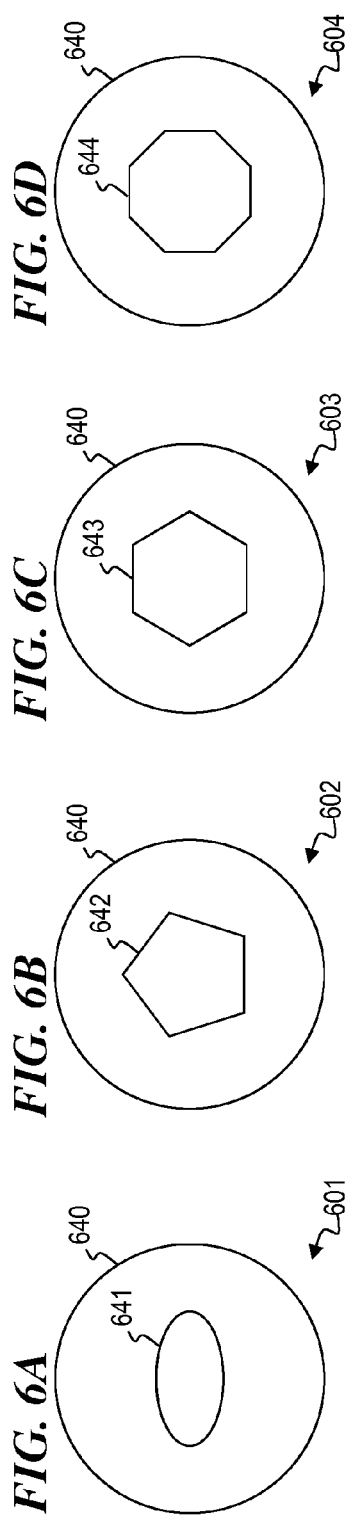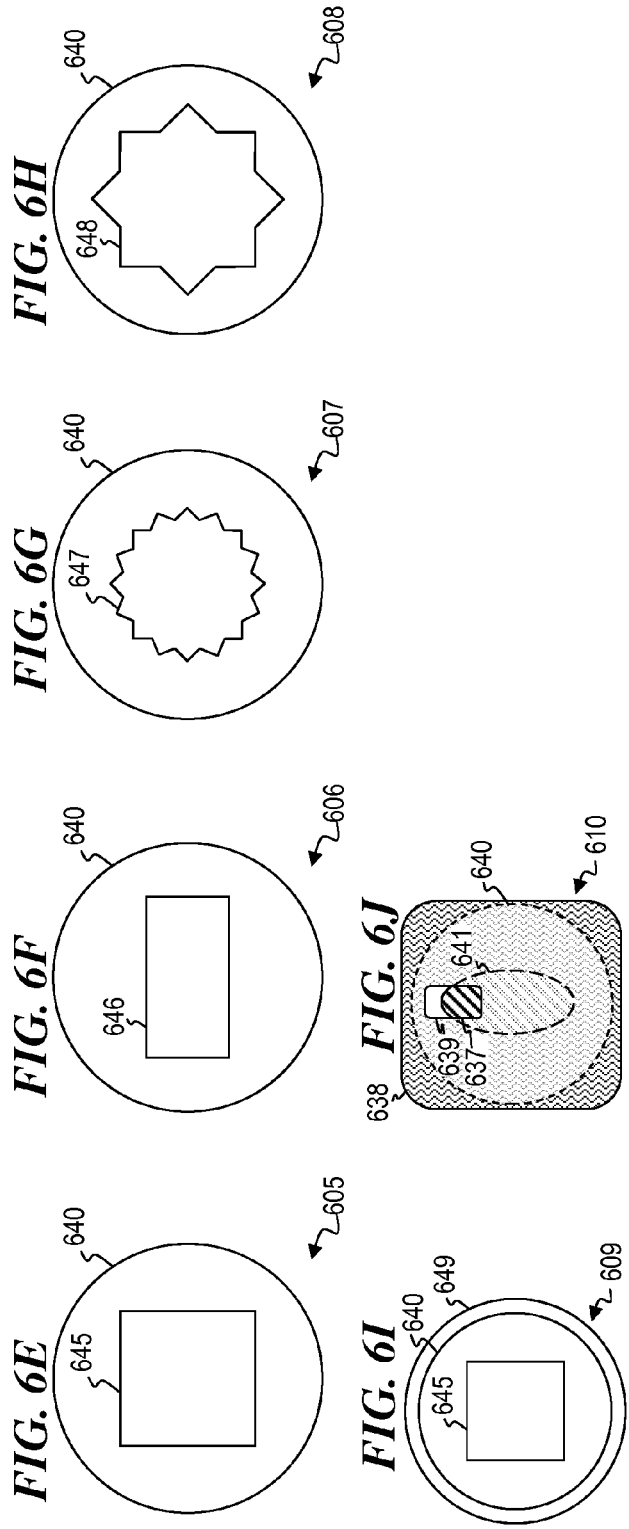

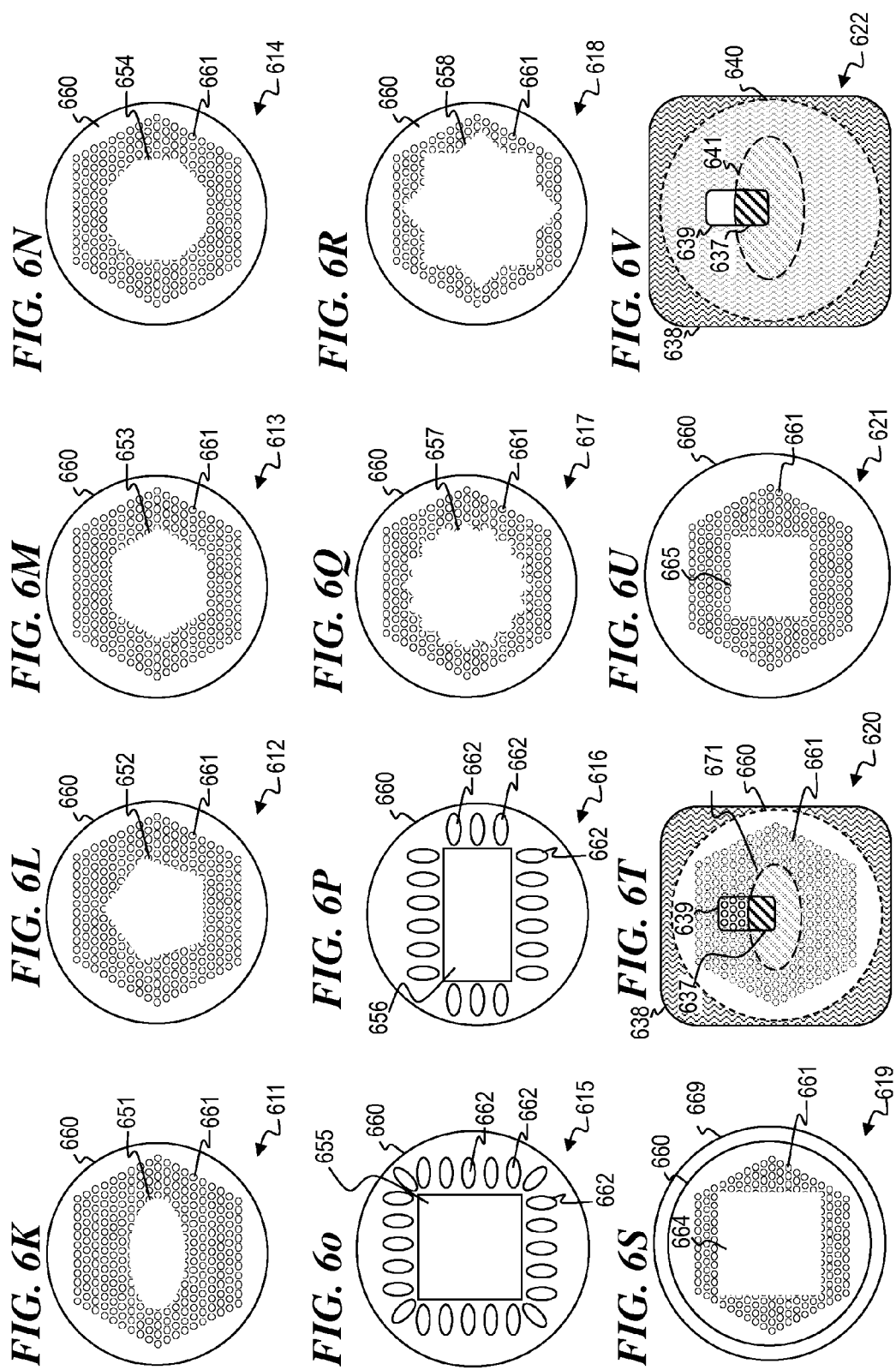

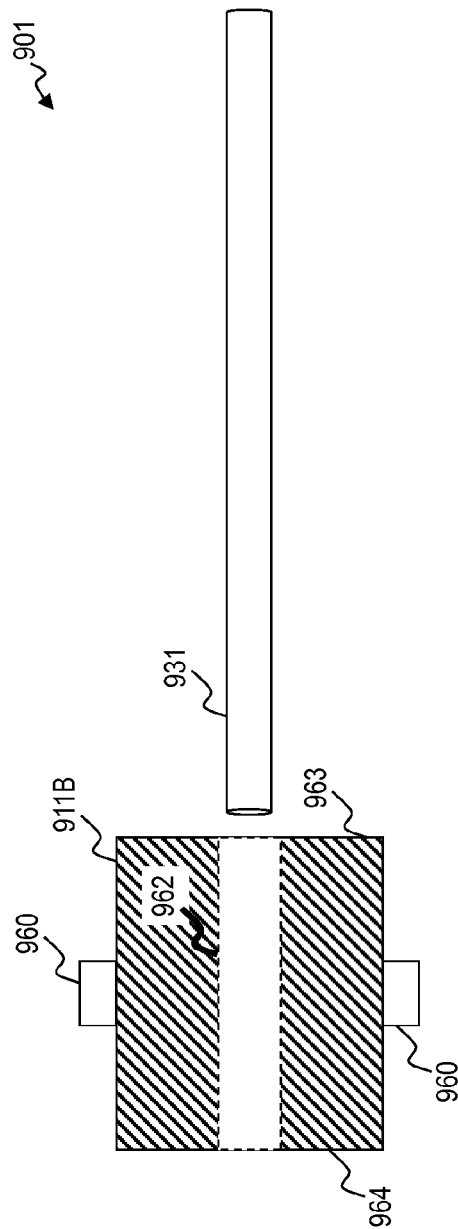
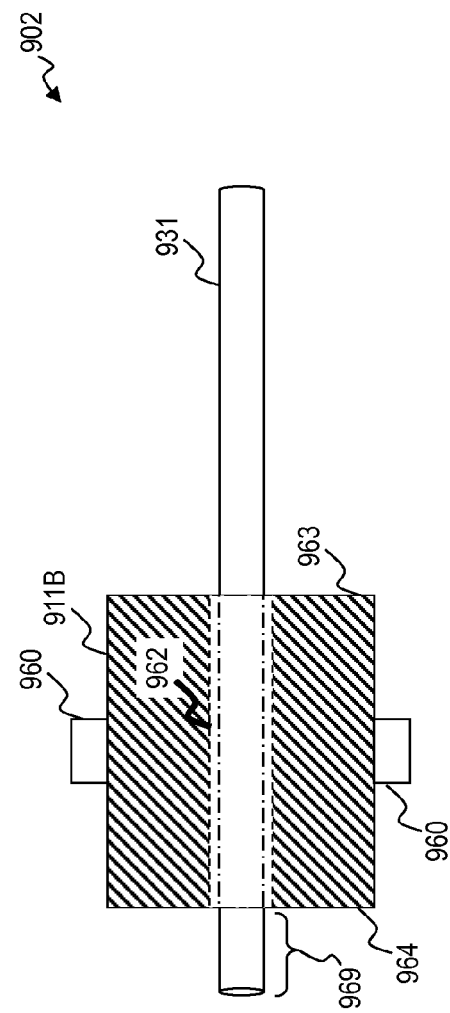
FIG. 9A
FIG. 9B

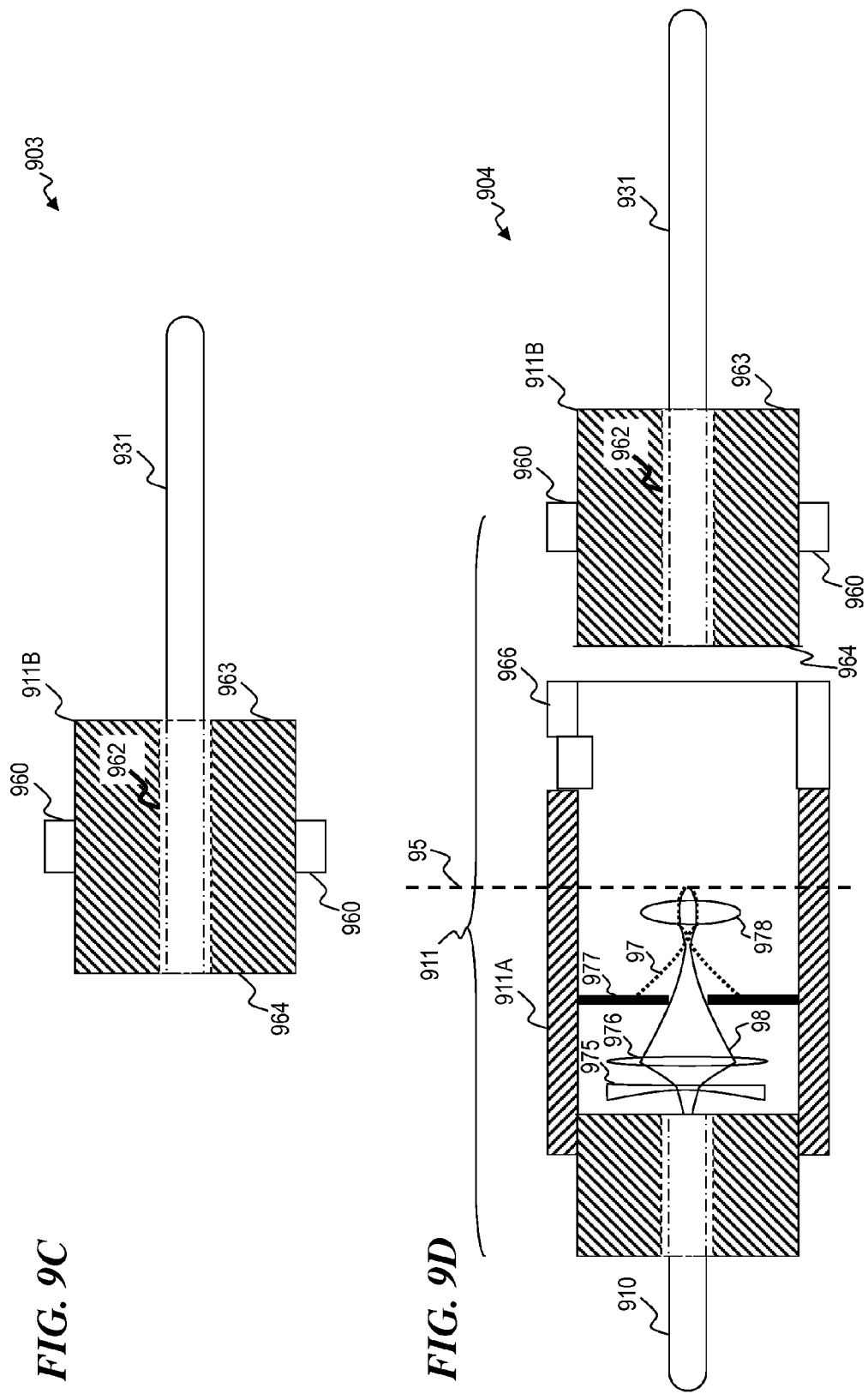

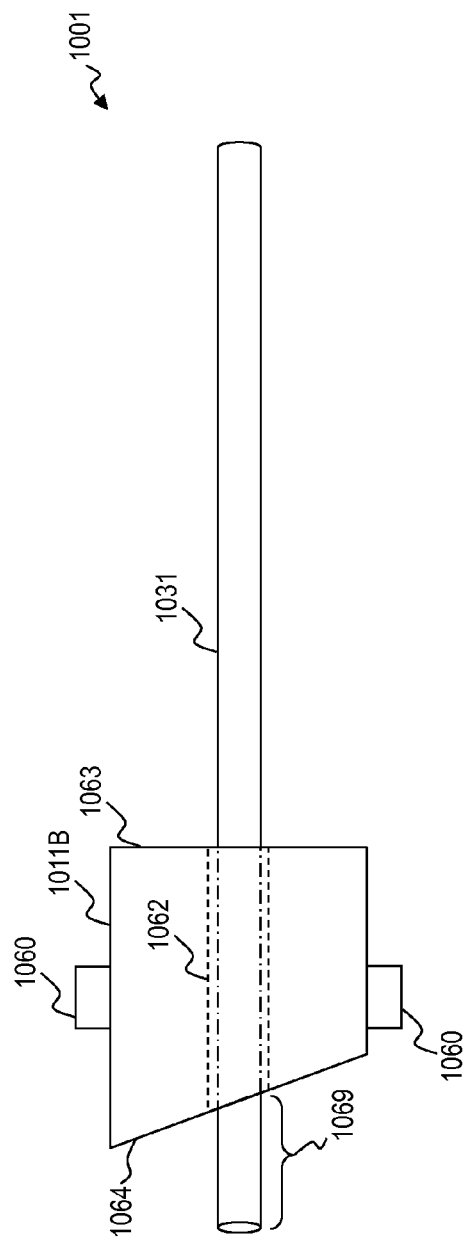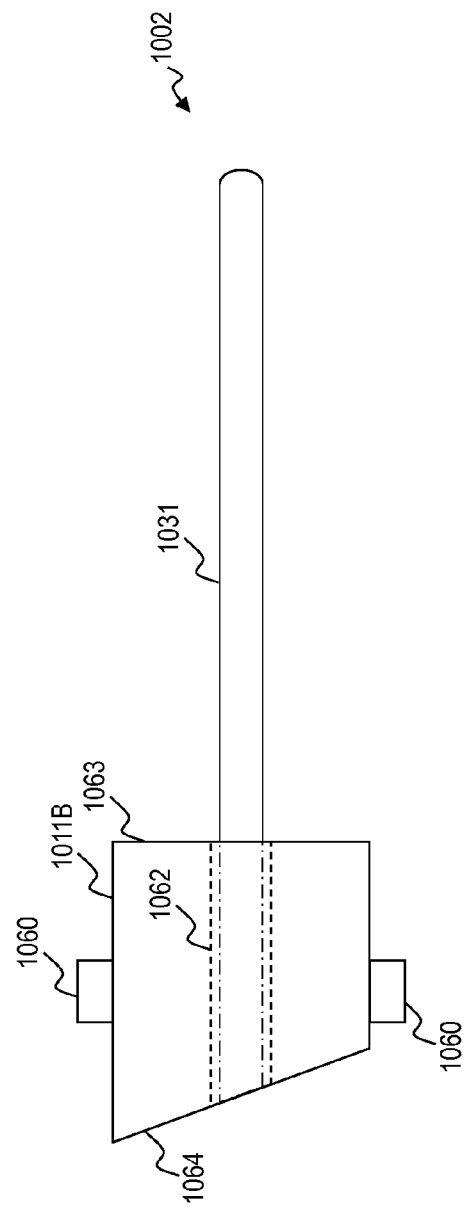
FIG. 10A
FIG. 10B

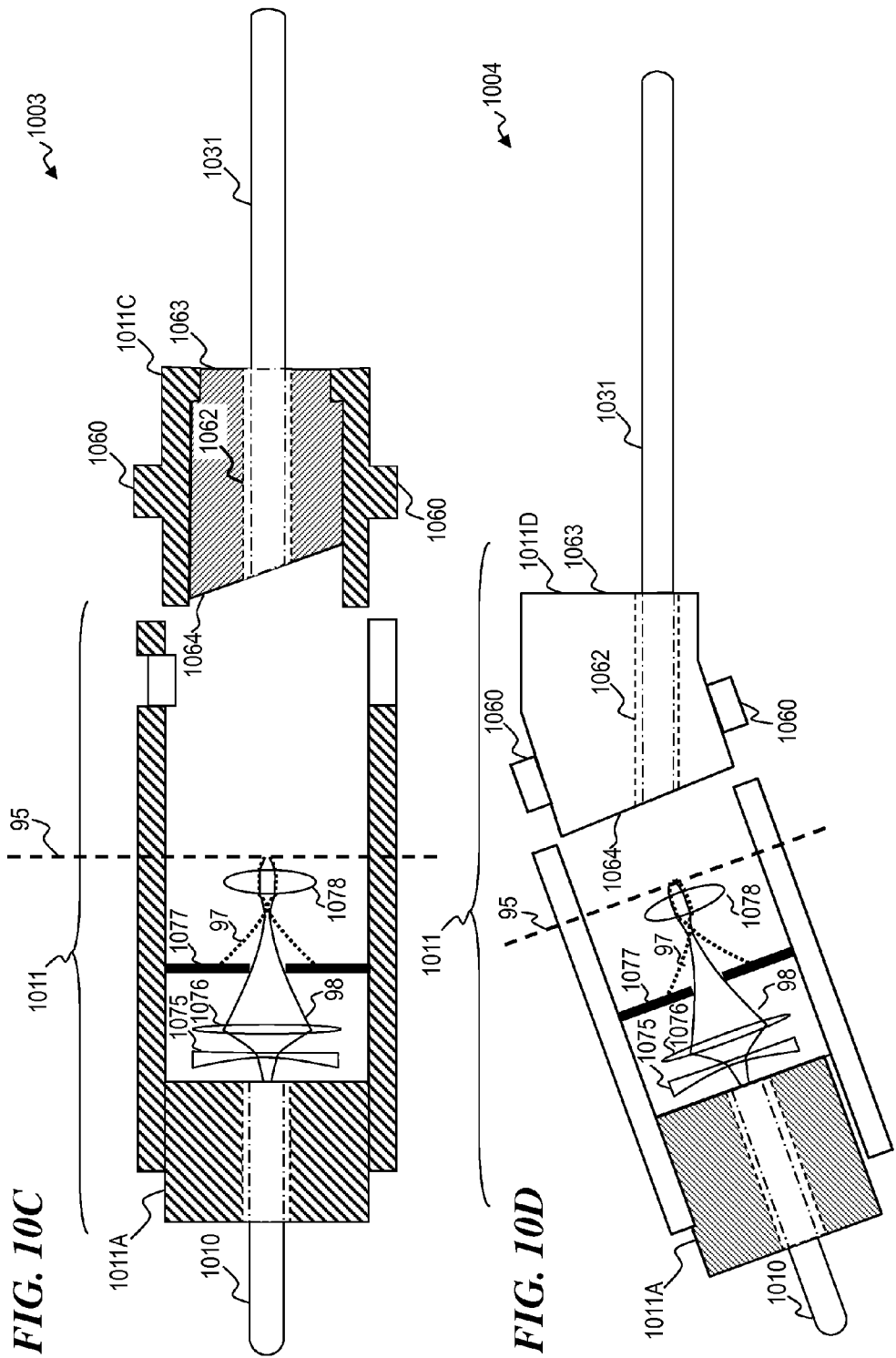

SYSTEM AND METHOD FOR A DELIVERY FIBER FOR ISOLATION AGAINST BACK REFLECTIONS

This application is a divisional of and claims benefit of U.S. patent application Ser. No. 13/085,354 filed on Apr. 12, 2011, titled "HIGH-POWER LASER SYSTEM HAVING DELIVERY FIBER WITH NON-CIRCULAR CROSS SECTION FOR ISOLATION AGAINST BACK REFLECTIONS" by Matthias P. Savage-Leuchs (which issued as U.S. Pat. No. 8,736,953 on May 27, 2014), which claims priority under 35 U.S.C. §119(e) to U.S. Provisional Patent Application No. 61/343,947 filed on Apr. 12, 2010, titled "HIGH-POWER LASER SYSTEM HAVING DELIVERY FIBER WITH NON-CIRCULAR CROSS SECTION FOR ISOLATION AGAINST BACK REFLECTIONS" by Matthias P. Savage-Leuchs, U.S. Provisional Patent Application No. 61/343,945 filed on Apr. 12, 2010, titled "Apparatus for optical fiber management and cooling" by Yongdan Hu et al., U.S. Provisional Patent Application No. 61/343,946 filed on Apr. 12, 2010, titled "Beam diagnostics and feedback system and method for spectrally beam-combined lasers" by Tolga Yilmaz et al., U.S. Provisional Patent Application No. 61/343,948 filed on Apr. 12, 2010, titled "HIGH BEAM QUALITY AND HIGH AVERAGE POWER FROM LARGE-CORE-SIZE OPTICAL-FIBER AMPLIFIERS; SIGNAL AND PUMP MODE-FIELD ADAPTOR FOR DOUBLE-CLAD FIBERS AND ASSOCIATED METHOD" by Matthias Savage-Leuchs et al., and U.S. Provisional Patent Application No. 61/343,949 filed on Apr. 12, 2010, titled "METHOD AND APPARATUS FOR IN-LINE FIBER-CLADDING-LIGHT DISSIPATION" by Yongdan Hu, which are each incorporated herein by reference in their entirety.

This invention is related to:

U.S. Pat. No. 6,456,756 issued Sep. 24, 2002 to Roy Mead, et al., titled "FIBER RAMAN AMPLIFIER PUMPED BY AN INCOHERENTLY BEAM COMBINED DIODE LASER,"

U.S. Pat. No. 7,792,166 issued Sep. 7, 2010 to Lawrence A. Borschowa, titled "APPARATUS AND METHOD FOR DRIVING LASER DIODES", U.S. Pat. No. 7,620,077 issued Nov. 17, 2009 to Angus J. Henderson, titled "APPARATUS AND METHOD FOR PUMPING AND OPERATING OPTICAL PARAMETRIC OSCILLATORS USING DFB FIBER LASERS", U.S. Pat. No. 7,701,987 issued Apr. 20, 2010 to Matthias P. Savage-Leuchs et al., titled "APPARATUS AND METHOD FOR GENERATING CHIRP-SLICE CONTROLLED-LINEWIDTH LASER-SEED SIGNALS", U.S. Pat. No. 7,471,705 issued Dec. 30, 2008 to David C. Gerstenberger et al., titled "ULTRAVIOLET LASER SYSTEM AND METHOD HAVING WAVELENGTH IN THE 200-NM RANGE", U.S. Pat. No. 7,391,561 issued Jun. 24, 2008 to Fabio Di Teodoro et al., titled "FIBER—OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD", U.S. Pat. No. 7,430,352 issued Sep. 30, 2008 to Fabio Di Teodoro et al., titled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD", U.S. Pat. No. 7,379,648 issued May 27, 2008 to Christopher D. Brooks et al., titled "OPTICAL HOLLOW-CORE DELIVERY FIBER AND HOLLOW-ENDCAP TERMINATION AND ASSOCIATED METHOD", U.S. Pat. No. 7,386,211 issued Jun. 10, 2008 to Fabio Di Teodoro et al., titled "METHOD AND APPARATUS FOR SPECTRAL-BEAM COMBINING OF MEGAWATT-PEAK-POWER BEAMS FROM PHOTONIC-CRYSTAL RODS", U.S. Pat. No. 7,400,804 issued Jul. 15, 2008 to Fabio Di Teodoro et al., titled "MONOLITHIC OR RIBBON-LIKE MULTI-CORE PHOTONIC-CRYSTAL FIBERS AND ASSOCIATED METHOD", U.S. Pat. No. 7,429,734 issued Sep. 30, 2008 to Steven C. Tidwell, titled "SYSTEM AND METHOD FOR AIRCRAFT INFRARED COUNTERMEASURES TO MISSILES", U.S. Pat. No. 7,199,924 issued on Apr. 3, 2007 to Andrew J. W. Brown et al., titled "APPARATUS AND METHOD FOR SPECTRAL-BEAM COMBINING OF HIGH-POWER FIBER LASERS", U.S. Pat. No. 7,768,700 issued Aug. 3, 2010 to Matthias P. Savage-Leuchs, titled "METHOD AND APPARATUS FOR OPTICAL GAIN FIBER HAVING SEGMENTS OF DIFFERING CORE SIZES", U.S. Pat. No. 7,872,794 issued Jan. 18, 2011 to John D. Minelly et al., titled "HIGH-ENERGY EYE-SAFE PULSED FIBER AMPLIFIERS AND SOURCES OPERATING IN ERBIUM'S L-BAND", U.S. patent application Ser. No. 12/624,327 titled "SPECTRALLY BEAM COMBINED LASER SYSTEM AND METHOD AT EYE-SAFER WAVELENGTHS" filed on Nov. 23, 2009 by Roy D. Mead (which issued as U.S. Pat. No. 8,441,718 May 14, 2013), U.S. Provisional Patent Application 61/263,736 filed Nov. 23, 2009 by Matthias P. Savage-Leuchs et al., titled "Q-switched oscillator seed-source for MOPA laser illuminator method and apparatus", and U.S. patent application Ser. No. 12/854,868 titled "IN-LINE FORWARD/BACKWARD FIBER-OPTIC SIGNAL ANALYZER" filed on Aug. 11, 2010 by Tolga Yilmaz et al. (which issued as U.S. Pat. No. 8,755,649 on Jun. 17, 2014), which are all incorporated herein in their entirety by reference.

FIELD OF THE INVENTION

The invention relates generally to optical waveguides and more particularly to delivery waveguides for reducing the amount of back-reflected light that is coupled back into an amplifying or lasing optical fiber and associated damage to high-power master-oscillator power-amplifier (MOPA) laser systems, wherein, in some embodiments, one or more delivery waveguides are formed in a delivery fiber, and the delivery fiber has a non-circular waveguide and a mode-field adaptor/beam collimator that work together to prevent back reflections from a distal end of the delivery fiber from propagating back into the power-amplifier stage, and wherein, in some embodiments, the delivery fiber is connectorized and/or sterilized and is considered disposable and replaceable.

BACKGROUND OF THE INVENTION

High-power laser systems (for example, laser systems employing a master-oscillator power-amplifier (MPOA) configuration) are subject to damage if a back-reflected signal from a distal end of a delivery fiber re-enters the power-amplifier stage. Typically, circular fibers are used as delivery fibers for pulsed and continuous-wave (CW) laser signals. However, it has been shown (M. Fermann, "Single-mode excitation of multimode fibers with ultrashort pulses", OPTICS LETTERS/Vol. 23, No. 1/Jan. 1, 1998, which is incorporated herein by reference) that the fundamental mode in a fiber can propagate in multimode fibers over long distances. Therefore, when a reflection occurs after the laser light exits the delivery fiber, laser light can propagate backwards in the delivery fiber and maintain or nearly maintain its beam quality. Consequently, reflected signals can be coupled into the amplifier and lead to damage of the amplifier or laser. To prevent this, conventional systems typically employ an optical isolator that allows only one-directional signal propagation in a direction away from the power amplifier. Such isolators are expensive and complex.

U.S. Pat. No. 7,576,909 issued to Harter, et al. on Aug. 18, 2009 titled "Multimode amplifier for amplifying single mode light," and is incorporated herein by reference. Harter et al. describe techniques for the control of the spatial as well as spectral beam quality of multi-mode fiber amplification of high-peak-power pulses, as well as using such a configuration to replace diode-pumped, Neodynium based sources. Harter et al. assert that perfect spatial beam-quality can be ensured by exciting the fundamental mode in the multi-mode fibers with appropriate mode-matching optics and techniques. The loss of spatial beam-quality in the multi-mode fibers along the fiber length can be minimized by using multi-mode fibers with large cladding diameters. Near diffraction-limited coherent multi-mode amplifiers can be conveniently cladding pumped, allowing for the generation of high average power. Moreover, the polarization state in the multi-mode fiber amplifiers can be preserved by implementing multi-mode fibers with stress producing regions or elliptical fiber cores.

U.S. Pat. No. 7,590,323 to Broeng et al. issued Sep. 15, 2009 titled "Optical fibre with high numerical aperture, method of its production, and use thereof" and is incorporated herein by reference. Broeng et al. describe an optical fiber, having at least one core surrounded by a first outer cladding region, the first outer cladding region being surrounded by a second outer cladding region, the first outer cladding region in the cross-section comprising a number of first outer cladding features having a lower refractive index than any material surrounding the first outer cladding features, wherein for a plurality of said first outer cladding features, the minimum distance between two nearest neighboring first outer cladding features is smaller than 1.0 µm or smaller than an optical wavelength of light guided through the fiber when in use; a method of its production, and use thereof. They also describe fibers built from performs having non-circular tubes or rods that form non-circular cores for the collection of light from laser diodes having non-symmetric non-circular beams.

A paper in the 30 Oct. 2006 Vol. 14, No. 22 of OPTICS EXPRESS pages 10345-10350 by J. R. Hayes et al. titled "Square core jacketed air-clad fiber" is incorporated herein by reference. Hayes et al. describe fabrication of a highly multi-mode square core jacketed air-clad fiber with a top-hat near-field intensity profile, and using this fiber to deliver Q-switched pulses to ablate square marks on indium tin oxide films.

There is a need for improved laser systems, particularly optical-fiber lasers and/or optical-fiber amplifiers having delivery fibers, wherein systems have improved optical isolation to prevent optical feedback due to reflections in the delivery fiber or at its ends from traveling back into, and damaging, the optical-fiber lasers and/or optical-fiber amplifiers. There is also a need to eliminate a conventional isolator to reduce the cost, size and complexity of the system.

SUMMARY OF THE INVENTION

In some embodiments, the present invention provides a method, an apparatus, and disposable parts thereof for a laser-delivery fiber that has a non-circular core cross-sectional area. In some embodiments, the signal-light output from a relatively small-core gain fiber is directed into a relatively large-core gain fiber that has a non-circular core. In some embodiments, signal light is coupled from a higher brightness fiber to a lower brightness fiber. In some embodiments, the gain fiber can be slightly multimoded. As used herein, the proximal end of the delivery fiber is the light-input end next to the gain fiber of the laser or optical amplifier that provides the signal light, while the distal end is the opposite light-output end at which the signal light is used or directed from. The forward-propagating signal light that enters the proximal delivery fiber is well mixed by the geometry of the core of the delivery fiber, and any reflections from the distal end of the delivery fiber (due, for example, to its design, its use (e.g., from, bones and/or metal pieces in case of a wounded soldier, blood or tissue that may be next to or deposit on the end), or from damage to the distal end of the delivery fiber) that become unwanted backward-propagating light will be further mixed such that multiple modes of the reflected signal light will return from the entry end of the delivery fiber, and only a very small portion (generally at a power level that is 20-30 dB less than the output beam power) will re-enter the gain fiber. In some embodiments, the end of the delivery fiber is angled relative to the output beam of the gain fiber, but has a sufficiently high numerical aperture (e.g., NA=0.2 to 0.3) that substantially all the output beam from the gain fiber enters the core (the signal waveguide) of the delivery fiber; on the other hand, in some embodiments, the gain fiber has an NA of only 0.1 or so and back-reflected light from the delivery is at too steep an angle to re-enter the gain fiber as undesired backward-traveling signal light that can damage the gain fiber or various components (such as pump laser diodes) connected to the gain fiber. In some embodiments, the delivery fiber has an endcap attached to its entry end, wherein the endcap has a non-circular or a non-centered entry aperture that is sized and/or located such that it accepts substantially all the output light from the gain fiber traveling in the forward direction, but wherein the aperture of the entry endcap has a size, shape and/or offset from the core axis of the delivery-fiber that blocks a substantial amount of any backward signal reflections from the exit end of the delivery fiber. In some embodiments, the center axis of the core of the gain fiber is offset from the center axis of the core of the delivery fiber, also with the purpose that the larger NA of the delivery fiber will receive substantially all of the output beam from the gain fiber, but the smaller NA of the gain fiber will receive only a very small portion of and backward-traveling light reflected from the far end of the delivery fiber. In some embodiments, a combination of the mode mixing of the non-circular-core delivery fiber, the angled entry end of the delivery fiber, the size/shape/offset of the entry aperture or endcap, and/or the offset of the center axes of the cores of the two fibers work together to synergistically reduce the backward-traveling reflected signal light. In some embodiments, the delivery fiber is connectorized to enable it to be disposable and easily replaced. This is an important consideration for medical and other applications.

BRIEF DESCRIPTION OF THE DRAWINGS

FIG. 1A is a block diagram of a prior-art optical subsystem 101 that includes an optical gain fiber having a core interfaced to a multi-mode delivery fiber.

FIG. 1B is a block diagram of a prior-art optical subsystem 102 that includes an optical gain fiber having a core interfaced through an optical isolator 122 to a multi-mode delivery fiber.

FIG. 1C is a cross-section block diagram of a prior-art single-mode optical fiber 103 that includes circular single-mode core 141 surrounded by cladding layer 140.

FIG. 1D is a cross-section block diagram of a prior-art multi-mode optical fiber 104 that includes a large-diameter circular multi-mode core 142 surrounded by cladding layer 140.

FIG. 5A is a block diagram of optical subsystem 501 that includes an optical gain fiber 510 having a core optically coupled through a pair of collimating lens (521 and 523) to a multi-mode delivery fiber 531 having a non-circular core, according to some embodiments of the present invention.

FIG. 5B is a block diagram of optical subsystem 502 that includes an optical gain fiber 510 having a core optically coupled through a pair of collimating lens (521 and 523), one or more apertures 524, and one or more highly reflective mirrors 525 to a multi-mode delivery fiber 531 having a non-circular core, according to some embodiments of the present invention.

FIG. 6A is a block diagram cross-sectional view of a multi-mode optical delivery fiber 601 that includes a non-circular multi-mode core 641 surrounded by cladding layer 640, according to some embodiments of the present invention.

FIG. 6B is a block diagram cross-sectional view of a multi-mode optical delivery fiber 602 that includes a non-circular multi-mode core 642 surrounded by cladding layer 640, according to some embodiments of the present invention.

FIG. 6C is a block diagram cross-sectional view of a multi-mode optical delivery fiber 603 that includes a non-circular multi-mode core 643 surrounded by cladding layer 640, according to some embodiments of the present invention.

FIG. 6D is a block diagram cross-sectional view of a multi-mode optical delivery fiber 604 that includes a non-circular multi-mode core 644 surrounded by cladding layer 640, according to some embodiments of the present invention.

FIG. 6E is a block diagram cross-sectional view of a multi-mode optical delivery fiber 605 that includes a non-circular multi-mode core 645 surrounded by cladding layer 640, according to some embodiments of the present invention.

FIG. 6F is a block diagram cross-sectional view of a multi-mode optical delivery fiber 606 that includes a non-circular multi-mode core 646 surrounded by cladding layer 640, according to some embodiments of the present invention.

FIG. 6G is a block diagram cross-sectional view of a multi-mode optical delivery fiber 607 that includes a non-circular multi-mode core 647 surrounded by cladding layer 640, according to some embodiments of the present invention.

FIG. 6H is a block diagram cross-sectional view of a multi-mode optical delivery fiber 608 that includes a non-circular multi-mode core 648 surrounded by cladding layer 640, according to some embodiments of the present invention.

FIG. 6I is a block diagram cross-sectional view of a multi-mode optical delivery fiber 609 that includes a non-circular multi-mode core 645 surrounded by an inner cladding layer 640, which is in turn surrounded by an outer protective cladding 649, according to some embodiments of the present invention.

FIG. 6J is a block diagram cross-sectional view of a multi-mode optical delivery fiber 610 that includes a non-circular multi-mode core 641 surrounded by cladding layer 640 and a mask 638 having an offset light-entry aperture 639, according to some embodiments of the present invention.

FIG. 6K is a block diagram cross-sectional view of a multi-mode optical delivery fiber 611 that includes a non-circular multi-mode core 651 surrounded by air-cladding or photonic-crystal layer 661 and outer cladding layer 660, according to some embodiments of the present invention.

FIG. 6L is a block diagram cross-sectional view of a multi-mode optical delivery fiber 612 that includes a non-circular pentagonal-shaped multi-mode core 652 surrounded by air-cladding or photonic-crystal layer 661 and outer cladding layer 660, according to some embodiments of the present invention.

FIG. 6M is a block diagram cross-sectional view of a multi-mode optical delivery fiber 613 that includes a non-circular hexagonal-shaped multi-mode core 653 surrounded by air-cladding or photonic-crystal layer 661 and outer cladding layer 660, according to some embodiments of the present invention.

FIG. 6N is a block diagram cross-sectional view of a multi-mode optical delivery fiber 614 that includes a non-circular octagonal-shaped multi-mode core 654 surrounded by air-cladding or photonic-crystal layer 661 and outer cladding layer 660, according to some embodiments of the present invention.

FIG. 6o is a block diagram cross-sectional view of a multi-mode optical delivery fiber 615 that includes a non-circular substantially square-shaped multi-mode core 655 surrounded by air-cladding or photonic-crystal layer 662 and outer cladding layer 660, according to some embodiments of the present invention.

FIG. 6P is a block diagram cross-sectional view of a multi-mode optical delivery fiber 616 that includes a non-circular substantially rectangular-shaped multi-mode core 656 surrounded by air-cladding or photonic-crystal layer 662 and outer cladding layer 660, according to some embodiments of the present invention.

FIG. 6Q is a block diagram cross-sectional view of a multi-mode optical delivery fiber 617 that includes a non-circular star-shaped multi-mode core 657 surrounded by air-cladding or photonic-crystal layer 661 and outer cladding layer 660, according to some embodiments of the present invention.

FIG. 6R is a block diagram cross-sectional view of a multi-mode optical delivery fiber 618 that includes a non-circular star-shaped multi-mode core 658 surrounded by air-cladding or photonic-crystal layer 661 and outer cladding layer 660, according to some embodiments of the present invention.

FIG. 6S is a block diagram cross-sectional view of a multi-mode optical delivery fiber 619 that includes a non-circular substantially square-shaped multi-mode core 664 surrounded by air-cladding or photonic-crystal layer 661, and outer cladding layer 660, which is in turn surrounded by an outer protective cladding 669, according to some embodiments of the present invention.

FIG. 6T is a block diagram cross-sectional view of a multi-mode optical delivery fiber 620 that includes a non-circular multi-mode core 671 surrounded by air-cladding layer 661 and cladding layer 660 that includes a non-circular pentagonal-shaped multi-mode core 671 surrounded by air-cladding or photonic-crystal layer 661 and outer cladding layer 660, according to some embodiments of the present invention. and a mask 638 having an offset light-entry aperture 639, according to some embodiments of the present invention.

FIG. 6U is a block diagram cross-sectional view of a multi-mode optical delivery fiber 621 that includes a non-circular substantially square-shaped multi-mode core 665 surrounded by air-cladding or photonic-crystal layer 661 and outer cladding layer 660, according to some embodiments of the present invention.

FIG. 6V is a block diagram cross-sectional view of a multi-mode optical delivery fiber 622 that includes a non-circular multi-mode core 641 surrounded by a cladding layer 640, according to some embodiments of the present invention, and a mask 638 having an offset light-entry aperture 639, according to some embodiments of the present invention.

FIG. 9A is a block diagram of apparatus 901 that includes non-circular core optical delivery fiber 931 and connector 911B, according to some embodiments of the present invention.

FIG. 9B is a block diagram of apparatus 902 that includes non-circular core optical delivery fiber 931 inserted through connector 911B, according to some embodiments of the present invention.

FIG. 9C is a block diagram of apparatus 903 that includes non-circular core optical delivery fiber 931 and connector 911B, according to some embodiments of the present invention.

FIG. 9D is a block diagram of apparatus 904 that includes non-circular core optical delivery fiber 931, connector 911B and adaptor 911A, according to some embodiments of the present invention.

FIG. 10A is a block diagram of apparatus 1001 that includes non-circular core optical delivery fiber 1031 inserted through angled connector 1011B, according to some embodiments of the present invention.

FIG. 10B is a block diagram of apparatus 1002 that includes non-circular core optical delivery fiber 1031 and angled connector 1011B, according to some embodiments of the present invention.

FIG. 10C is a block diagram of apparatus 1003 that includes non-circular core optical delivery fiber 1031, connector 1011C and straight adaptor 1011A, according to some embodiments of the present invention.

FIG. 10D is a block diagram of apparatus 1004 that includes non-circular core optical delivery fiber 1031, connector 1011D and straight adaptor 1011A, according to some embodiments of the present invention.

DETAILED DESCRIPTION

Figure 2:
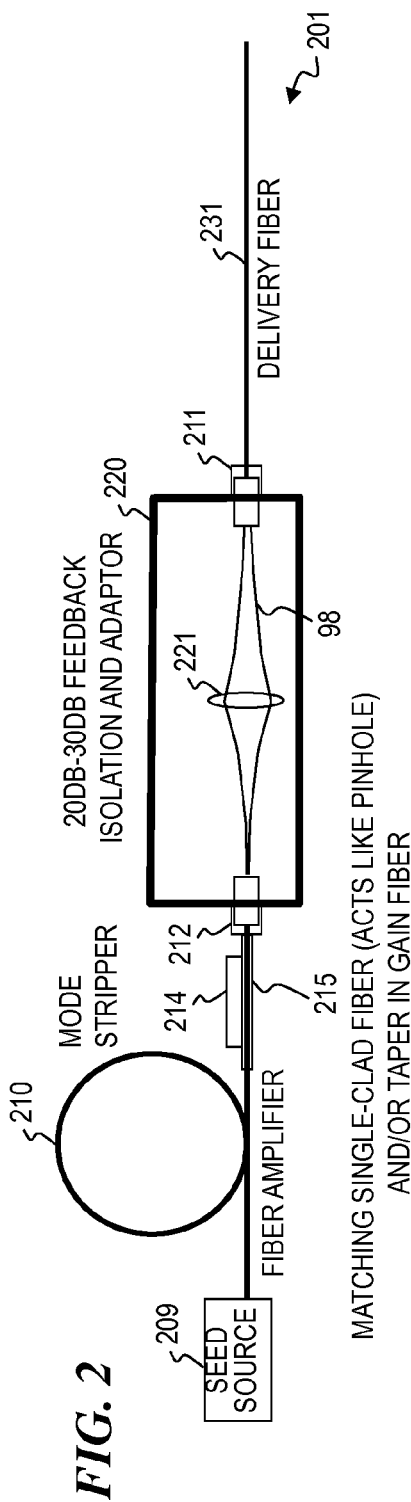
FIG. 2 is a block diagram of an improved optical subsystem 201 that includes an optical gain fiber 210 having a core interfaced through a feedback-isolation-and-adaptor unit 220 to a multi-mode delivery fiber 231 having a non-circular core, according to some embodiments of the present invention.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

FIG. 1A is a block diagram of a prior-art optical subsystem 101 that includes an optical gain fiber having a core interfaced to a multi-mode delivery fiber. According to this configuration the optical signal 91 from a seed source is amplified in gain fiber 110 and becomes amplified forward-traveling signal 98 that is interfaced into a conventional multi-mode delivery fiber 130 by lens 121. According to Ferman's 1998 paper (M. Fermann, "Single-mode excitation of multimode fibers with ultrashort pulses", OPTICS LETTERS/Vol. 23, No. 1/Jan. 1, 1998) the high quality output of gain fiber 110 will be conveyed down the multi-mode fiber 130 substantially intact and without loss. This is less than desirable in certain applications such as medical laser energy delivery because of the concentration of energy in the center of the Gaussian output beam. In addition, this configuration has the undesirable quality of also conveying any reflected signal 97 (such as the reflection from human tissue, other objects in the environment, imperfections in or on the output end of the delivery fiber, and the like) substantially intact and without loss and will reenter the gain fiber in the backward traveling direction where signal 97 will be further amplified and cause undesirable heating and other damage to the gain fiber and its pump sources. One conventional way to alleviate some of these problems is to use an optical isolator, such as shown in FIG. 1B, however this adds substantial cost to the system and also does not address the problem of having the energy of the output beam 98 concentrated at the center of the Gaussian beam when it lands on the tissue 99.

FIG. 1B is a block diagram of a prior-art optical subsystem 102 that includes an optical gain fiber having a core interfaced through an optical isolator unit 120 to a multi-mode delivery fiber. This configuration addresses the problem of backward traveling beams (described in FIG. 1A above) by introducing a 20 dB to 30 dB loss in the backward traveling beam (such as may re-enter the delivery fiber 130 from a reflection from human tissue or other object in the environment as described above. This configuration does not address the issue of energy concentrated at the center of the Gaussian beam and also has the undesirable result of the isolator 122 reducing power in the forward traveling beam due to the inherent properties of the isolator 122. Subsystem 102 also includes and input ferrule 112 that releasable connects gain fiber 110 to isolator 120, and output ferrule 111 that releasable connects delivery fiber 130 to isolator unit 120. Isolator unit 120 further includes collimating lens 121 that collimates the forward traveling beam from gain fiber 110 and directs the collimated beam to isolator 122 and collimating lens 123 that focuses the collimated beam from isolator 122 into the core of delivery fiber 130.

FIG. 1C is a block diagram cross-sectional view of a prior-art single-mode optical fiber 103 that includes circular single-mode core 141 surrounded by cladding layer 140 and FIG. 1D is a block diagram cross-sectional view of a prior-art multi-mode optical fiber 104 that includes circular multi-mode core 142 surrounded by cladding layer 140. Conventional optical systems use a delivery fiber having either a single-mode circular core (e.g., optical fiber 103) when a thin cut or incision is desired or a multi-mode circular core (e.g., optical fiber) when a more uniform power output is desired.

As used herein, "feedback isolation" is optical isolation that permits signal light propagation in a forward direction, but inhibits signal light propagation in the opposite (backward) direction. As used herein, an "adaptor unit" includes an interface from one optical subsystem (such as an optical power amplifier) and another optical subsystem (such as a delivery fiber).

FIG. 2 is a block diagram of an improved optical subsystem 201 that includes an optical gain fiber 210 having a core interfaced through a feedback-isolation-and-adaptor unit 220 to a multi-mode delivery fiber 231 having a non-circular core, according to some embodiments of the present invention. In some embodiments of the present invention, optical subsystem 201 addresses the both the problem of backward traveling beams (described in FIG. 1A above) and the issue of energy concentrated at the center of the Gaussian output beam (also described above in FIG. 1A). Optical subsystem 201 addresses the issue of optical energy being concentrated at the center of a Gaussian beam (i.e., one wherein the spatial cross-section exhibits a Gaussian profile) by using a delivery fiber 231 that has a non-circular core which has the effect of causing the single-mode forward-traveling amplified beam 98 to be mode mixed in the non-circular core delivery fiber 231, even over short distances. In contrast to the Gaussian beam output by prior-art optical subsystems 101 and 102 using optical fiber 103 and 104, optical subsystem 201 of the present invention will output a beam with a significantly degraded beam quality, wherein the optical energy of the output beam will be substantially uniform over the area of the beam spot. Having a beam spot with uniform output energy is very desirable in many applications, including medical laser treatment procedures. The issue of backward traveling beams caused by reflections of the output beam from human tissue, other objects in the operational environment, imperfections in or on the output end of the delivery fiber, or the like, is also addressed in the present invention with the use of the non-circular core delivery fiber 231. In the situation of the backward traveling reflected beam, the non-circular core delivery fiber 231 is used to protect a optical subsystem 201 because, when the light output from the non-circular delivery fiber 231 is reflected back into the delivery fiber 231 propagates in a backward direction towards the amplifying gain fiber 210, only a small amount of light is coupled back into the gain fiber 210. The worst case of coupling of the backward traveling beam into the gain fiber 210 corresponds to the brightness difference between the delivery fiber 231 and the gain fiber 210. As described in the present invention, laser systems with non-circular delivery fibers can achieve isolation of about 20 dB to 30 dB without requiring the use of an isolator unit and such isolation is capable and sufficiently high to isolate and protect against feedback reflections.

In some embodiments, the present invention provides isolation against optical feedback by using non-circular delivery fibers, isolation levels of 20 dB-40 dB, a reduction in insertion loss even without the use of an isolator, a reduction in the laser power required because an isolator is not used, and further, non circular deliver fibers have the added benefit of producing a top-hat intensity profile and provides an optimum interaction of the optical radiation with treated tissue.

Optical subsystem 201 of the present invention also includes a seed source 209 optically coupled to fiber amplifier 210 that provides an optical signal into the core of the gain fiber 210, input ferrule 212 that releasable connects gain fiber 210 to isolator and adaptor unit 220, and output ferrule 211 that releasable connects delivery fiber 231 to isolator and adaptor unit 220. Isolator and adaptor unit 220 further includes lens 221 that focuses the forward traveling beam 98 from gain fiber 210 and into the non-circular core of delivery fiber 231. Additionally, in some embodiments, optical subsystem 201 further includes a mode stripper 214 coupled to the gain fiber 210 to remove unwanted optical light from the cladding of the gain fiber 210 and a matching single-clad fiber 215 connected between the output end of the gain fiber 210 and the input ferrule 212 which acts like a pinhole and eliminates light which would otherwise propagate in the pump cladding of the gain fiber 210 and might lead to damage of the pump diodes. In some embodiments, the cladding of the delivery fiber 231 is single-clad and is anti-guiding and therefore strips any light coupled into its cladding.

Figure 3:
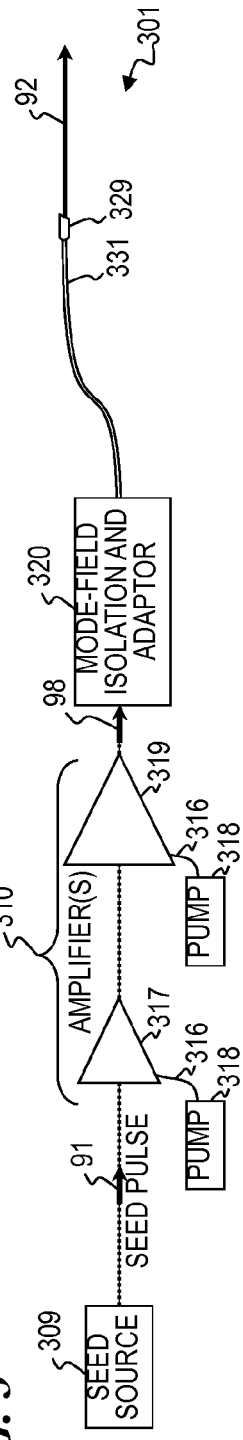
FIG. 3 is a block diagram of an improved subsystem 301 that includes an amplifier system 310 for amplifying a seed pulse 91 and outputting the amplified signal 98 into a feedback-isolation-and-adaptor unit 320 that is connected to a multi-mode delivery fiber 331 having a non-circular core, according to some embodiments of the present invention.

FIG. 3 is a block diagram of an improved optical subsystem 301 that includes an amplifier system 310 for amplifying a seed pulse 91 and outputting the amplified signal 98 into a feedback-isolation-and-adaptor unit 320 that is connected to a multi-mode delivery fiber 331 having a non-circular core, according to some embodiments of the present invention. In some embodiments, amplifier system 310 is a two-stage amplifying system that includes first optical pump 318 optically connected to amplifier 317 through optical fiber 316 and a second optical pump 318 optically connected to amplifier 319 through optical fiber 316. In some embodiments, seed source 309 is configured to output optical seed pulse 91 and provide optical seed source 91 to amplifier system 310. Amplifier system 310 is configured to receive optical seed pulse 91 and amplify the seed pulse in the first amplifier 317 and the second amplifier 318 and output amplified optical pulse to the isolation and adaptor unit 320. In some embodiments, amplified optical pulse 98 propagates through isolation and adaptor unit 320 and is output into non-circular multi-mode delivery fiber 331, wherein the amplified optical pulse 98 is mode mixed and output through endcap 329 as output pulse 92 from the exit end of the non-circular multi-mode delivery fiber 331, resulting in output pulse 92 having a generally uniform power density.

Figure 4C:
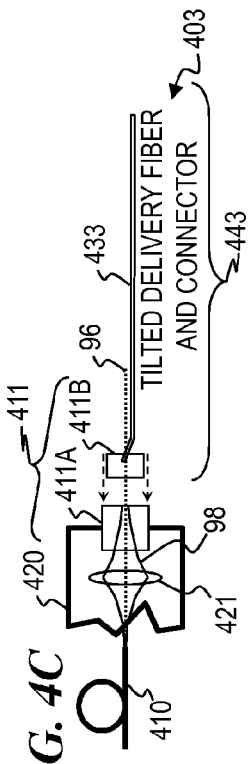
FIG. 4C is a block diagram of subsystem 403 that includes a tilted multi-mode delivery fiber 433, according to some embodiments of the present invention.
Figure 4D:
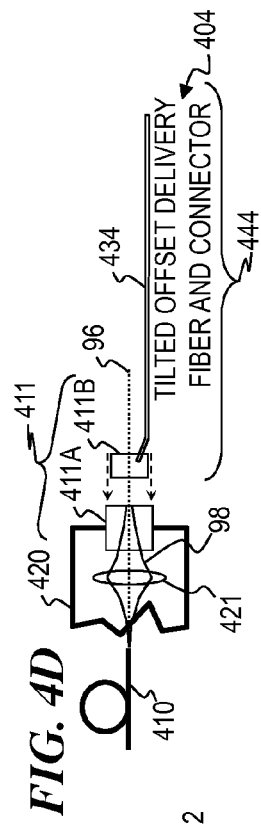
FIG. 4D is a block diagram of subsystem 404 that includes a tilted and offset multi-mode delivery fiber 434, according to some embodiments of the present invention.
Figure 4A:
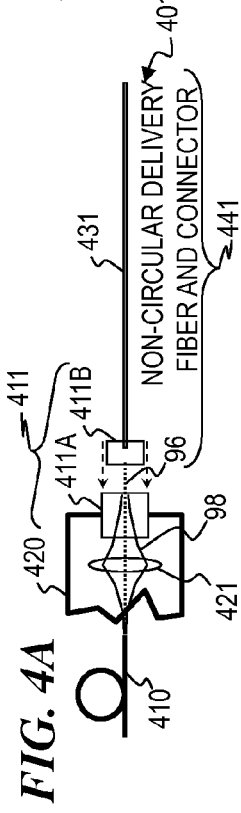
FIG. 4A is a block diagram of subsystem 401 that includes a multi-mode delivery fiber 431 having a non-circular core, according to some embodiments of the present invention.

FIG. 4A is a block diagram of subsystem 401 that includes a multi-mode delivery fiber 431 having a non-circular core, a connector 411B, according to some embodiments of the present invention. In some embodiments, subsystem 401 is similar to optical subsystem 201 of FIG. 2, described above, in that subsystem 401 also addresses both the problem of backward traveling beams (described in FIG. 1A above) and the issue of energy concentrated at the center of the Gaussian output beam (also described above in FIG. 1A), through the use of non-circular delivery fiber 431. In some embodiments, subsystem 401 also includes a connector 411B that is attached to the entrance end of the delivery fiber 431 and connector 411B is configured to connect and disconnect to adaptor 411A. In some embodiments, adaptor 411A and connector 411B combine together as ferrule 411 and provide a means for connecting and disconnecting the delivery fiber to the isolator and adaptor unit 420. In some embodiments, subsystem 401 includes amplifying fiber 410 configured to output amplified light 98 into isolator and adaptor unit 420. Isolator and adaptor unit 420 further includes lens 421, which is configured to focus amplified light signal 98 that is output by a fiber amplifier 410 (as described above in FIG. 2) into the entry end of non-circular delivery fiber 431.

FIGS. 4B-4H, show additional embodiments according to the present invention reduces the amount of backward traveling reflected light that enters the amplifier fiber, thereby improving the achievable isolation to even more sufficiently isolate and protect the optical subsystem against feedback reflections. In some embodiments, the subsystems in FIGS. 4B-4H also address the issue of energy concentrated at the center of the Gaussian output beam (also described above in FIG. 1A) by using a non-circular core delivery fiber. FIGS. 4B-4H each include fiber amplifier 410 configured to output amplified light into isolator and adaptor unit 420 as described above for FIG. 4A and further includes lens 421 configured to focus amplified light 98 into the delivery fiber and adaptor 411A configured to connect and disconnect from connector 411B and together with connector 411B forms a ferrule. In some embodiments, each subsystem described in FIGS. 4B-4H include an aperture (not shown) that allows substantially all of amplified light 98 to pass through, but prevents a portion of the backward traveling reflected light from passing through and thus further reduces the amount of reflected light that enters the fiber amplifier 410.

Figure 4B:
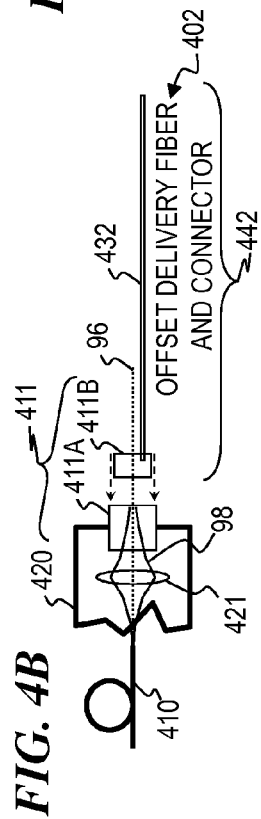
FIG. 4B is a block diagram of subsystem 402 that includes an offset multi-mode delivery fiber 432, according to some embodiments of the present invention.

FIG. 4B is a block diagram of subsystem 402 that includes an offset multi-mode delivery fiber 432, according to some embodiments of the present invention. In some embodiments, subsystem 402 further reduces the amount of backward traveling reflected light from entering the amplifying stage of the optical subsystem and damaging the optical subsystem by offsetting the placement of the entry end of delivery fiber 432 in connector 411B a linear distance away from an optical axis 96 created by amplified light 98 being focused by lens 421. That is, in some embodiments, the delivery fiber connector is configured such that the axis of the core of the delivery fiber is substantially parallel to the axis of the core of the amplifying fiber and/or to a central axis 96 of the focused beam from lens 421 and/or to a central axis of the lens 421, but wherein the axis of the core of the delivery fiber is radially offset from the axis of the core of the amplifying fiber and/or from the central axis of the focused beam from lens 421 and/or from a central axis of the lens 421. In some embodiments, this radial offset is accomplished by mounting the fiber into its connector 411B such that the central axis of the fiber is radially offset from the central axis of the connector, and the adaptor 411A is concentric with the central axis of lens 421 and the end of the core of amplifying fiber 410, while in other embodiments, the fiber is mounted into its connector 411B such that the central axis of the fiber is concentric with the central axis of the connector, and the adaptor 411A is radially offset to the central axis of lens 421 and the end of the core of amplifying fiber 410, while in still other embodiments, the fiber is mounted into its connector 411B such that the central axis of the fiber is concentric with the central axis of the connector and the adaptor 411A is concentric to the end of the core of amplifying fiber 410, but the central axis of lens 421 is radially offset from these axes. In some embodiments, delivery fiber 432 has a numerical aperture (NA) sufficiently large (in some such embodiments, a diffraction-limited beam at the output of a 20-micron-core-diameter gain fiber has an approximate NA of about 0.04 (when the signal beam has a 1-micron wavelength)-0.08 (when the signal beam has a 2-micron wavelength), therefore a delivery fiber having a numerical aperture that is at least two times the NA of the gain fiber makes sense, and thus some embodiments use a delivery fiber having an NA of at least 0.2) to accept substantially all of the focused amplified light 98 into the core of delivery fiber 432 and amplifying fiber 410 has a sufficiently small NA such that substantially none of the backward-traveling reflected light enters fiber amplifier 410. In some embodiments, delivery fiber 432 has a non-circular core to cause mixing of the single-mode amplified light 98 such that the light output by delivery fiber 432 has a more uniform energy profile. In some embodiments, the lateral (in the radial direction) distance by which the optical axis of the entry end of deliver fiber 432 is offset from optical axis 96 by an amount that is one to two times the diameter of the mode profile of the signal beam at the output of the gain fiber, or one to two times the diameter of the core of the gain fiber. In other embodiments, the linear distance by which the center longitudinal axis of the entry end of deliver fiber 432 is offset from the center longitudinal optical axis 96 is more than 0.25 times, but less than one (1) times the mode field diameter of the signal beam at the output of the gain fiber. In still other embodiments, the linear distance by which the center longitudinal axis of the entry end of deliver fiber 432 is offset from the center longitudinal optical axis 96 is at least 1.2 times, or at least 1.4 times, or at least 1.6 times, or at least 1.8 times, or at least 2.0 times the mode field diameter of the signal beam at the output of the gain fiber.

For example, in some embodiments having a gain fiber with an NA of about 0.04, the delivery fiber has an NA of at least 0.07, while in other embodiments having a gain fiber with an NA of about 0.04, the delivery fiber has an NA of at least 0.08, an NA of at least 0.09, an NA of at least 0.10, an NA of at least 0.11, an NA of at least 0.12, an NA of at least 0.14, an NA of at least 0.16, an NA of at least 0.18, an NA of at least 0.20, an NA of at least 0.22, or even an NA of at least 0.24.

For another example, in some embodiments having a gain fiber with an NA of 0.08, the delivery fiber has an NA of at least 0.15, while in other embodiments having a gain fiber with an NA of about 0.08, the delivery fiber has an NA of at least 0.16, an NA of at least 0.18, an NA of at least 0.20, an NA of at least 0.22, an NA of at least 0.24, an NA of at least 0.26, an NA of at least 0.28, or even an NA of at least 0.3.

FIG. 4C is a block diagram of subsystem 403 that includes a tilted-end multi-mode delivery fiber 433, according to some embodiments of the present invention. In some embodiments, subsystem 403 further reduces the amount of backward traveling reflected light from entering the amplifying stage of the optical subsystem and damaging the optical subsystem by tilting the entry end of delivery fiber 433 relative to the central axis of connector 411B such that an angle is formed between the tilted end of delivery fiber 433 and an optical axis 96 created by amplified light 98 being focused by lens 421, however the entry end of delivery fiber 433 (i.e., the end surface of delivery fiber 433 wherein amplified light signal 98 enters delivery fiber 433) continues to be lined up with optical axis 96. In other embodiments, the delivery fiber connector is configured such that the axis of the core of the delivery fiber is substantially parallel to the central axis of connector 411B, but the central axis of adaptor 411A is tilted relative to optical axis 96, the core of the amplifying fiber and/or to a central axis of the focused beam from lens 421 and/or to a central axis of the lens 421. In some other embodiments, this tilt is accomplished by mounting the fiber into its connector 411B such that the central axis of the fiber is parallel to and centered on the central axis of the connector, and the adaptor 411A is concentric with the end of the core of amplifying fiber 410, but the central axis of lens 421 is tilted relative to the axis of delivery fiber 433. In some embodiments, delivery fiber 433 has a numerical aperture (NA) sufficiently large (e.g., an NA of at least 0.15) to accept substantially all of the focused amplified light 98 into the tilted core of delivery fiber 432 and amplifying fiber 410 has a sufficiently small NA such that substantially none of the backward-traveling reflected light exiting delivery fiber 433 at an angle with respect to optical axis 96 enters fiber amplifier 410. In some embodiments, delivery fiber 433 has a non-circular core to cause mixing of the single-mode amplified light 98 such that the light output by delivery fiber 433 has a more uniform energy profile. In some embodiments, the angle between the axis of the delivery fiber at the entry end of deliver fiber 433 and the optical axis 96 of the output end of the gain fiber is about 0.05 radians (wherein the delivery fiber has an NA of at least about 0.05 (which is the sine of 0.05 radians)) to about 0.5 radians (wherein the delivery fiber has an NA of at least about 0.48 (which is the sine of 0.5 radians)). This range is equal to about 3 degrees, wherein the delivery fiber has an NA of at least about 0.052; to about 30 degrees, wherein the delivery fiber has an NA of at least 0.5. In other embodiments, this angle is about 0.1 radians, about 0.15 radians, about 0.2 radians, about 0.25 radians, about 0.3 radians, about 0.35 radians, about 0.4 radians, or about 0.45 radians.

FIG. 4D is a block diagram of subsystem 404 that includes a tilted-and-offset-end multi-mode delivery fiber 434, according to some embodiments of the present invention. In some embodiments, subsystem 404 further reduces the amount of backward traveling reflected light from entering the amplifying stage of the optical subsystem and damaging the optical subsystem by both offsetting the placement of the entry end of delivery fiber 434 with respect to an optical axis 96 created by amplified light 98 being focused by lens 421 and by tilting the entry end of delivery fiber 434 in connector 411B such that an angle is formed between the tilted end of delivery fiber 434 and an optical axis 96. In other embodiments, the delivery fiber connector is configured such that the axis of the core of the delivery fiber is substantially parallel to the central axis of connector 411B, but the central axis of adaptor 411A is tilted and offset relative to optical axis 96, the core of the amplifying fiber and/or to a central axis of the focused beam from lens 421 and/or to a central axis of the lens 421. In some other embodiments, this tilt and offset is accomplished by mounting the fiber into its connector 411B such that the central axis of the fiber is parallel to and centered on the central axis of the connector, and the adaptor 411A is concentric with the end of the core of amplifying fiber 410, but the central axis of lens 421 is radially offset and tilted relative to the axis of delivery fiber 433. In some embodiments, delivery fiber 434 has a numerical aperture (NA) sufficiently large (e.g., in some embodiments, an NA of at least about 0.16) to accept substantially all of the focused amplified light 98 into the offset and tilted core of delivery fiber 434 and amplifying fiber 410 has a sufficiently small NA such that substantially none of the backward-traveling reflected light exiting delivery fiber 434 offset and at an angle with respect to optical axis 96 enters fiber amplifier 410. In some embodiments, delivery fiber 434 has a non-circular core to cause mixing of the single-mode amplified light 98 such that the light output by delivery fiber 434 has a more uniform energy profile. In some embodiments, the linear distance by which the center longitudinal axis of the entry end of deliver fiber 434 is offset from the center longitudinal optical axis 96 is at least one times the mode field diameter of the signal beam as it exits the gain fiber. In other embodiments, the linear distance by which the center longitudinal axis of the entry end of deliver fiber 434 is offset from the center longitudinal optical axis 96 is at least 1.2 times, or at least 1.4 times, or at least 1.6 times, or at least 1.8 times, or at least 2.0 times the mode field diameter. In some embodiments, the angle between the entry end of deliver fiber 434 and the optical axis 96 is about 0.05 radians to about 0.5 radians. In other embodiments, the angle between the entry end of deliver fiber 434 and the optical axis 96 is at least about 0.1 radians, at least about 0.15 radians, at least about 0.2 radians, at least about 0.25 radians, at least about 0.3 radians, at least about 0.35 radians, at least about 0.4 radians, or at least about 0.45 radians, but in each of these cases less than about 1 radian.

Figure 4E:
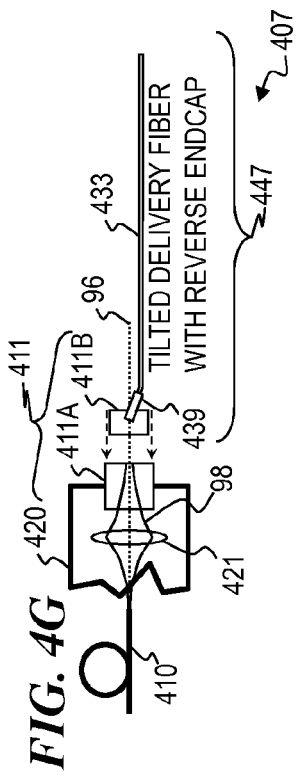
FIG. 4E is a block diagram of subsystem 405 that includes a multi-mode delivery fiber 431 having a reverse endcap 439, according to some embodiments of the present invention.

FIG. 4E is a block diagram of subsystem 405 that includes a multi-mode delivery fiber 431 having a reverse endcap 439 connected between connector 411B and delivery fiber 431, according to some embodiments of the present invention. In some embodiments, subsystem 405 is substantially similar to subsystem 401 described above, however subsystem 405 also includes reverse endcap 439 that further degrades the backward-traveling reflected light and thus further reduces the amount of backward-traveling reflected light that enters fiber amplifier 410. In some embodiments, reverse endcap 439 includes a short section of fiber having a core (either substantially circular or non-circular) that is larger than the core of non-circular delivery fiber 431. In some embodiments, the reverse endcap 439 having its larger core fiber section degrades the reflected light propagating backwards in delivery fiber 431. In some embodiments, the maximum length of the reverse endcap 439 is chosen so that when the amplified light 98 from fiber amplifier 410 propagates (in the forward direction) through reverse endcap 439, the brightness of the amplified light 98 does not degrade in the endcap more than the brightness of amplified light that propagates through the smaller core-size delivery fiber 431 would degrade. However, reverse endcap 439 further degrades the brightness of reflected light propagating backwards and therefore reverse endcap 439 will reduce the coupling of the reflected light into the fiber amplifier 410.

Figure 4F:
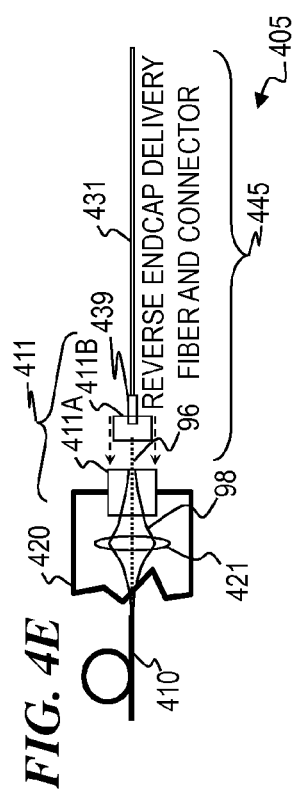
FIG. 4F is a block diagram of subsystem 406 that includes an offset multi-mode delivery fiber 432 having a reverse endcap 439, according to some embodiments of the present invention.

FIG. 4F is a block diagram of subsystem 406 that includes an offset multi-mode delivery fiber 432 having a reverse endcap 439, according to some embodiments of the present invention. In some embodiments, subsystem 406 is substantially similar to subsystem 402 described above, however subsystem 406 also includes reverse endcap 439 that further degrades the backward-traveling reflected light and thus further reduces the amount of backward-traveling reflected light that enters fiber amplifier 410.

Figure 4G:
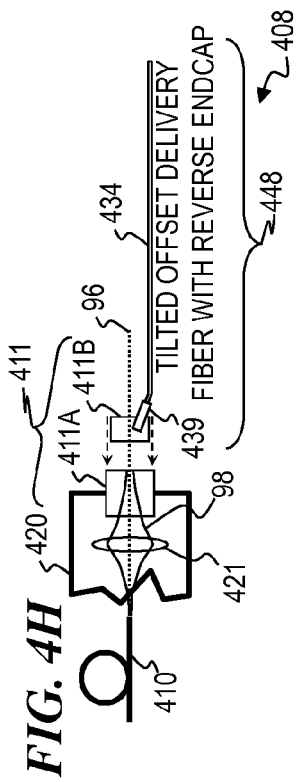
FIG. 4G is a block diagram of subsystem 407 that includes a tilted multi-mode delivery fiber 433 having a reverse endcap 439, according to some embodiments of the present invention.

FIG. 4G is a block diagram of subsystem 407 that includes a tilted multi-mode delivery fiber 433 having a reverse endcap 439, according to some embodiments of the present invention. In some embodiments, subsystem 407 is substantially similar to subsystem 403 described above, however subsystem 407 also includes reverse endcap 439 that further degrades the backward-traveling reflected light and thus reverse endcap 439 further reduces the amount of backward-traveling reflected light that enters fiber amplifier 410.

Figure 4H:
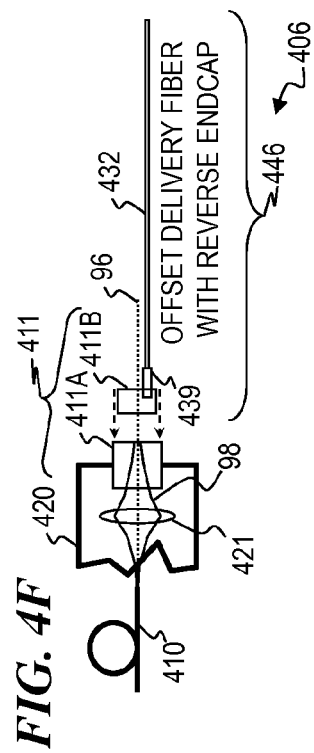
FIG. 4H is a block diagram of subsystem 408 that includes a tilted and offset multi-mode delivery fiber 434 having a reverse endcap 439, according to some embodiments of the present invention.

FIG. 4H is a block diagram of subsystem 408 that includes a tilted and offset multi-mode delivery fiber 434 having a reverse endcap 439, according to some embodiments of the present invention. In some embodiments, subsystem 408 is substantially similar to subsystem 404 described above, however subsystem 408 also includes reverse endcap 439 that further degrades the backward-traveling reflected light and thus reverse endcap 439 further reduces the amount of backward-traveling reflected light that enters fiber amplifier 410.

FIG. 5A is a block diagram of optical subsystem 501 that includes an optical gain fiber 510 having a core optically coupled through a pair of collimating lens (521 and 523) to a multi-mode delivery fiber 531 having a non-circular core, according to some embodiments of the present invention. In some embodiments, optical subsystem 501 includes a optical fiber amplifier 510 configured to amplify optical light signal 91 and output amplified light signal 98 from the output end of gain fiber 510. In some embodiments, collimating lens 521 is optically coupled to the output end of gain fiber 510 and receives and collimates amplified light signal 98. In some embodiments, lens 523 is optically coupled to the input end of delivery fiber 531 and receives the collimated amplified light signal 98 from lens 521 and focuses the amplified light signal 98 into the input end of the non-circular core delivery fiber 531. Amplified light signal 98 propagates through multi-mode delivery fiber 531 where amplified light signal 98 is mixed and is output through the output end of non-circular core delivery fiber 531 where the amplified light signal 98 interacts with sample 99. In some embodiments, the mode mixing of the amplified light signal 98 that occurs during propagation through the non-circular core multi-mode delivery fiber 531 causes the output amplified light signal to have a more uniform energy density. In some embodiments, backward-traveling light 97 is generated by reflections of the light signal 98 with the sample 99 as well as other interfaces and imperfections within optical system 501 and propagates through the delivery fiber in a direction opposite to the amplified light signal 98 where it will exit from the input end of delivery fiber 531. In some embodiments, the beam quality of backwards propagating light signal 97 is highly degraded due to the non-circular core of delivery fiber 531 and therefore backward-traveling light 97 will have a Rayleigh range that is shorter than the Rayleigh range of the forward-traveling amplifier light signal 98. In some embodiments, the distance between lens 521 and lens 523 is selected such that backward-traveling light 97 will significantly diverge and overfill lens 521, whereby the fraction of the coupled power of backward-traveling light 97 into gain fiber 510 is significantly reduced. In some embodiments, the distance d between lens 521 and lens 523 is $d \geq NA_{DF} * f_{523}/(M^2 * \lambda)$ wherein $NA_{DF}$ the NA of the non-circular delivery fiber 531, $f_{523}$ the focal length of lens 523, $M^2$ is the beam quality of the light coming back from the delivery fiber 531, $\lambda$, is the laser wavelength of the signal beam. In some further embodiments, an aperture 524 is inserted between lens 521 and lens 523 to provide further reduction of backward-traveling light 97, for example, when the fiber used on the output of the amplifier 510 is a double clad fiber. In still further embodiments, an enclosure 528 includes an adaptor 411A (such as shown in FIG. 4A) configured to receive a connector 411B, which is used on the end of the delivery fiber 531 (such as shown in FIG. 4A) and the offset and/or tilting mechanism described above in FIGS. 4B-4D is used for tilting and/or offsetting lens 521 and/or 523 and/or for tilting and/or offsetting connector 411B and/or adaptor 411A to further reduce the amount of backward-traveling reflected light 97 that can enter fiber amplifier 510.

FIG. 5B is a block diagram of optical subsystem 502 that includes an optical gain fiber 510 having a core optically coupled through a pair of collimating lens (521 and 523), one or more apertures 524, and one or more highly reflective mirrors 525 to a multi-mode delivery fiber 531 having a non-circular core, according to some embodiments of the present invention. In some embodiments, optical subsystem 502 utilizes the increased Rayleigh range of the backward-traveling light 97, as discussed above for FIG. 5A, in a compact arrangement. In some embodiments, optical subsystem 502 includes isolator and adaptor unit 520 which includes collimating lens 521 configured to collimate amplified light signal 98, one or more highly reflective mirrors 525 configured to reflect forward-traveling amplified light signal 98, and collimating lens 523 configured to focus forward-traveling light signal 98 into the non-circular core of delivery fiber 531. In some embodiments, the one or more highly-reflecting mirrors 525 increase the path length that amplified light signal 98 and backward-traveling light signal 97 travel between lens 521 and lens 523 in a compact manner. Using the configuration of subsystem 502, the optical path length between lens 521 and lens 523 is, in some embodiments, increased in order to further decrease the amount of backward-traveling light 97 that is coupled into the gain fiber 510 in a compact manner without sacrificing performance. In some embodiments, optical subsystem further includes input ferrule 512, which includes connector 512B and adaptor 512A and allows gain fiber 510 to be connected and disconnected to isolator and adaptor unit 520. In some embodiments, optical subsystem further includes output ferrule 511, which includes connector 511B and adaptor 511A and allows delivery fiber 531 to be connected and disconnected to isolator and adaptor unit 520. In some embodiments, isolator and adaptor unit 520 further includes one or more apertures 524 for further reducing the amount of backward-traveling light 97 that is coupled into gain fiber 510. In some embodiments, the optical path length between lens 521 and lens 523 is greater than the Rayleigh length of the backward-traveling light signal 97, but shorter than the forward-traveling amplified light signal 98. In still further embodiments, the offset and/or tilting mechanism described above in FIGS. 4B-4D is used for tilting and/or offsetting lens 521 and/or 523 and/or for tilting and/or offsetting connector 411B and/or adaptor 411A to further reduce the amount of backward-traveling reflected light 97 that can enter fiber amplifier 510.

FIG. 6A is a block diagram cross-sectional view of a multi-mode optical delivery fiber 601 that includes a non-circular multi-mode core 641 surrounded by cladding layer 640, according to some embodiments of the present invention. In some embodiments, the non-circular core 641 is substantially oval in shape.

FIG. 6B is a block diagram cross-sectional view of a multi-mode optical delivery fiber 602 that includes a non-circular multi-mode core 642 surrounded by cladding layer 640, according to some embodiments of the present invention. In some embodiments, the non-circular core 642 is substantially a polygon in shape (e.g., in some embodiments, a regular polygon such as an equilateral triangle, a square, a pentagon, a hexagon, a heptagon, an octagon or other regular polygon, while in other embodiments, the core is a non-regular polygon such as a non-square rectangle or other polygonal shape). In yet other embodiments, the core has any non-circular shape such as an oval or wavy curved circumference. In still other embodiments, the core is round but has stress rods, areas of higher or lower index of refraction, or similar elements in it. Such elements lead to enhanced mode coupling. In yet still other embodiments, an airclad or photonic crystal structure is used around the core (e.g., forming a core that is quasi round), for example, such as the embodiments described in FIG. 6K through 6V.

FIG. 6C is a block diagram cross-sectional view of a multi-mode optical delivery fiber 603 that includes a non-circular multi-mode core 643 surrounded by cladding layer 640, according to some embodiments of the present invention. In some embodiments, the non-circular core 641 is substantially hexagonal in shape.

FIG. 6D is a block diagram cross-sectional view of a multi-mode optical delivery fiber 604 that includes a non-circular multi-mode core 644 surrounded by cladding layer 640, according to some embodiments of the present invention. In some embodiments, the non-circular core 641 is substantially octagonal in shape.

FIG. 6E is a block diagram cross-sectional view of a multi-mode optical delivery fiber 605 that includes a non-circular multi-mode core 645 surrounded by cladding layer 640, according to some embodiments of the present invention. In some embodiments, the non-circular core 641 is substantially square in shape.

FIG. 6F is a block diagram cross-sectional view of a multi-mode optical delivery fiber 606 that includes a non-circular multi-mode core 646 surrounded by cladding layer 640, according to some embodiments of the present invention. In some embodiments, the non-circular core 641 is substantially rectangular in shape.

FIG. 6G is a block diagram cross-sectional view of a multi-mode optical delivery fiber 607 that includes a non-circular multi-mode core 647 surrounded by cladding layer 640, according to some embodiments of the present invention. In some embodiments, the non-circular core 647 is shaped as substantially a star-shaped polygon having both concave and convex vertices.

FIG. 6H is a block diagram cross-sectional view of a multi-mode optical delivery fiber 608 that includes a non-circular multi-mode core 648 surrounded by cladding layer 640, according to some embodiments of the present invention. In some embodiments, the non-circular core 648 is shaped as substantially a star-shaped polygon having both concave and convex vertices, but with fewer vertices than the embodiment shown in FIG. 6G.

FIG. 6I is a block diagram cross-sectional view of a multi-mode optical delivery fiber 609 that includes a non-circular multi-mode core 649 surrounded by cladding layer 640 and cladding layer 640 is surrounded by additional cladding, "cabling," and/or armor layers (e.g., in some embodiments, a triple-clad fiber) layer 649, according to some embodiments of the present invention. In some embodiments, the non-circular core 645 is shown as being substantially square in shape, however, other embodiments use a non-circular core of any suitably non-circular shape, including those described in the previous figures.

FIG. 6J is a block diagram cross-sectional view of a multi-mode optical delivery fiber 610 that includes a non-circular multi-mode core 641 surrounded by cladding layer 640 and a mask 638 having an offset light-entry aperture 639, according to some embodiments of the present invention. In some embodiments, the aperture is located such that a majority of the signal light from the gain fiber can enter the delivery fiber through the aperture 639, but a majority of the reflected signal light from the delivery fiber is blocked by the mask so it cannot re-enter the gain fiber, according to some embodiments of the present invention. In some embodiments, the aperture 639 is located and offset from the optical center of the optical delivery fiber 610 such that only a portion 637 of the aperture 639 overlaps with the non-circular core 641, such that a majority of the signal light from the gain fiber can enter the delivery fiber through the aperture 639, but a majority of the reflected signal light from the delivery fiber is blocked by the mask so it cannot re-enter the gain fiber.

FIG. 6K is a block diagram cross-sectional view of a multi-mode optical delivery fiber 611 that includes a non-circular multi-mode core 651 surrounded by air-cladding or photonic-crystal layer 661 and outer cladding layer 660, according to some embodiments of the present invention. In some embodiments, fiber 611 of FIG. 6K is substantially similar to fiber 601 of FIG. 6A described above, except that fiber 611 includes an air-cladding layer 661 to provide additional mode mixing of the optical signal in the optical delivery fiber 611.

FIG. 6L is a block diagram cross-sectional view of a multi-mode optical delivery fiber 612 that includes a non-circular pentagonal-shaped multi-mode core 652 surrounded by air-cladding layer 661 and cladding layer 660, according to some embodiments of the present invention. In some embodiments, fiber 612 of FIG. 6L is substantially similar to fiber 602 of FIG. 6B described above, except that fiber 612 includes an air-cladding layer 661 to provide additional mode mixing of the optical signal in the optical delivery fiber 612.

FIG. 6M is a block diagram cross-sectional view of a multi-mode optical delivery fiber 613 that includes a non-circular hexagonal-shaped multi-mode core 653 surrounded by air-cladding layer 661 and cladding layer 660, according to some embodiments of the present invention. In some embodiments, fiber 613 of FIG. 6M is substantially similar to fiber 603 of FIG. 6C described above, except that fiber 613 includes an air-cladding layer 661 to provide additional mode mixing of the optical signal in the optical delivery fiber 613.

FIG. 6N is a block diagram cross-sectional view of a multi-mode optical delivery fiber 614 that includes a non-circular octagonal-shaped multi-mode core 654 surrounded by air-cladding layer 661 and cladding layer 660, according to some embodiments of the present invention. In some embodiments, fiber 614 of FIG. 6N is substantially similar to fiber 604 of FIG. 6D described above, except that fiber 614 includes an air-cladding layer 661 to provide additional mode mixing of the optical signal in the optical delivery fiber 614.

FIG. 6o is a block diagram cross-sectional view of a multi-mode optical delivery fiber 615 that includes a non-circular substantially square-shaped multi-mode core 655 surrounded by air-cladding layer 662 and cladding layer 660, according to some embodiments of the present invention. In some embodiments, fiber 615 of FIG. 6o is substantially similar to fiber 605 of FIG. 6E described above, except that fiber 615 includes an air-cladding layer 662 to provide additional mode mixing of the optical signal in the optical delivery fiber 615.

FIG. 6P is a block diagram cross-sectional view of a multi-mode optical delivery fiber 616 that includes a non-circular substantially rectangular-shaped multi-mode core 656 surrounded by air-cladding layer 662 and cladding layer 660, according to some embodiments of the present invention. In some embodiments, fiber 616 of FIG. 6P is substantially similar to fiber 606 of FIG. 6F described above, except that fiber 616 includes an air-cladding layer 662 to provide additional mode mixing of the optical signal in the optical delivery fiber 616.

FIG. 6Q is a block diagram cross-sectional view of a multi-mode optical delivery fiber 617 that includes a non-circular star-shaped multi-mode core 657 surrounded by air-cladding layer 661 and cladding layer 660, according to some embodiments of the present invention. In some embodiments, Figure fiber 617 of 6Q is substantially similar to fiber 607 of FIG. 6G described above, except that fiber 617 includes an air-cladding layer 661 to provide additional mode mixing of the optical signal in the optical delivery fiber 617.

FIG. 6R is a block diagram cross-sectional view of a multi-mode optical delivery fiber 618 that includes a non-circular star-shaped multi-mode core 658 surrounded by air-cladding layer 661 and cladding layer 660, according to some embodiments of the present invention. In some embodiments, Figure fiber 618 of 6R is substantially similar to fiber 608 of FIG. 6H described above, except that fiber 618 includes an air-cladding layer 661 to provide additional mode mixing of the optical signal in the optical delivery fiber 618.

FIG. 6S is a block diagram cross-sectional view of a multi-mode optical delivery fiber 619 that includes a non-circular substantially square-shaped multi-mode core 664 surrounded by air-cladding layer 661, and cladding layer 660, which is in turn surrounded by an outer protective cladding 669, according to some embodiments of the present invention. In some embodiments, fiber 619 of FIG. 6S is substantially similar to fiber 609 of FIG. 6I described above, except that fiber 619 includes an air-cladding layer 661 to provide additional mode mixing of the optical signal in the optical delivery fiber 619.

FIG. 6T is a block diagram cross-sectional view of a multi-mode optical delivery fiber 620 that includes a non-circular multi-mode core 671 surrounded by air-cladding layer 661 and cladding layer 660 that includes a non-circular pentagonal-shaped multi-mode core 671 surrounded by air-cladding layer 661 and cladding layer 660, according to some embodiments of the present invention, and a mask 638 having an offset light-entry aperture 639, according to some embodiments of the present invention. In some embodiments, fiber 620 of FIG. 6T is substantially similar to fiber 610 of FIG. 6J described above, except that fiber 620 includes an air-cladding layer 661 to provide additional mode mixing of the optical signal in the optical delivery fiber 620. In some embodiments, the aperture 639 is located and offset from the optical center of the optical delivery fiber 620 such that only a portion 637 of the aperture 639 overlaps with the non-circular core 671, such that a majority of the signal light from the gain fiber can enter the delivery fiber through the aperture 639, but a majority of the reflected signal light from the delivery fiber is blocked by the mask so it cannot re-enter the gain fiber. In some embodiments, the aperture 639 is oriented at an "apogee" end of core 637 as is shown in FIG. 6J rather than as shown in this FIG. 6T.

FIG. 6U is a block diagram cross-sectional view of a multi-mode optical delivery fiber 621 that includes a non-circular substantially square-shaped multi-mode core 665 surrounded by air-cladding layer 661 and cladding layer 660, according to some embodiments of the present invention. In some embodiments, fiber 621 of FIG. 6U is substantially similar to fiber 605 of FIG. 6E described above, except that the non-circular substantially square-shaped core 665 of fiber 621 is smaller than the substantially-square core 645 of FIG. 6E, and in addition fiber 621 further includes an air-cladding layer 661 to provide additional mode mixing of the optical signal in the optical delivery fiber 611.

FIG. 6V is a block diagram cross-sectional view of a multi-mode optical delivery fiber 622 that includes a non-circular multi-mode core 641 surrounded by a cladding layer 640, according to some embodiments of the present invention. and a mask 638 having an offset light-entry aperture 639, according to some embodiments of the present invention. In some embodiments, delivery fiber 622 is substantially identical to delivery fiber 610 of FIG. 6J, however mask 638 is oriented such that aperture 639 is aligned to receive core light from the flat side of oval core 641, rather than from the "apogee" end of the oval core 641, as was the case in FIG. 6J.

Figure 7:
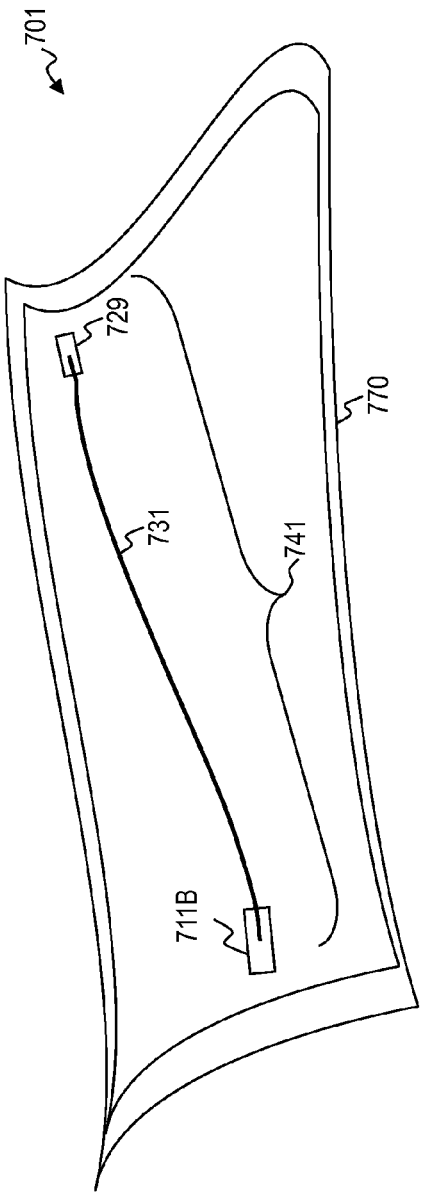
FIG. 7 is a block diagram of apparatus 701 that includes non-circular core optical delivery fiber 731 that is sterilized and enclosed in sterilized package 770, according to some embodiments of the present invention.

FIG. 7 is a block diagram of apparatus 701 that includes a delivery fiber assembly 741, having a non-circular core optical delivery fiber 731, that is sterilized and enclosed in package 770, according to some embodiments of the present invention. In some embodiments, apparatus 701 is used in a sterilized environment (e.g., a surgical operating room or the like) and the non-circular core optical delivery fiber 731 is removed from the sterilized package 770 and is connected to a laser system (e.g., those systems shown in FIG. 2, 3, 4A-4H, 5A, 5B, 8, 11A, or 11B) using adaptor 711B for the purpose of delivering an output optical pulse or signal through distal endcap 729 to a target (e.g., animal or human tissue, or the like). In some embodiments, after use, delivery fiber 731 can be disposed of (or, in some embodiments, sterilized and re-packaged). In various embodiments, each one of the embodiments described herein uses a delivery fiber assembly having a distal endcap as described for FIG. 7 here.

Figure 8:
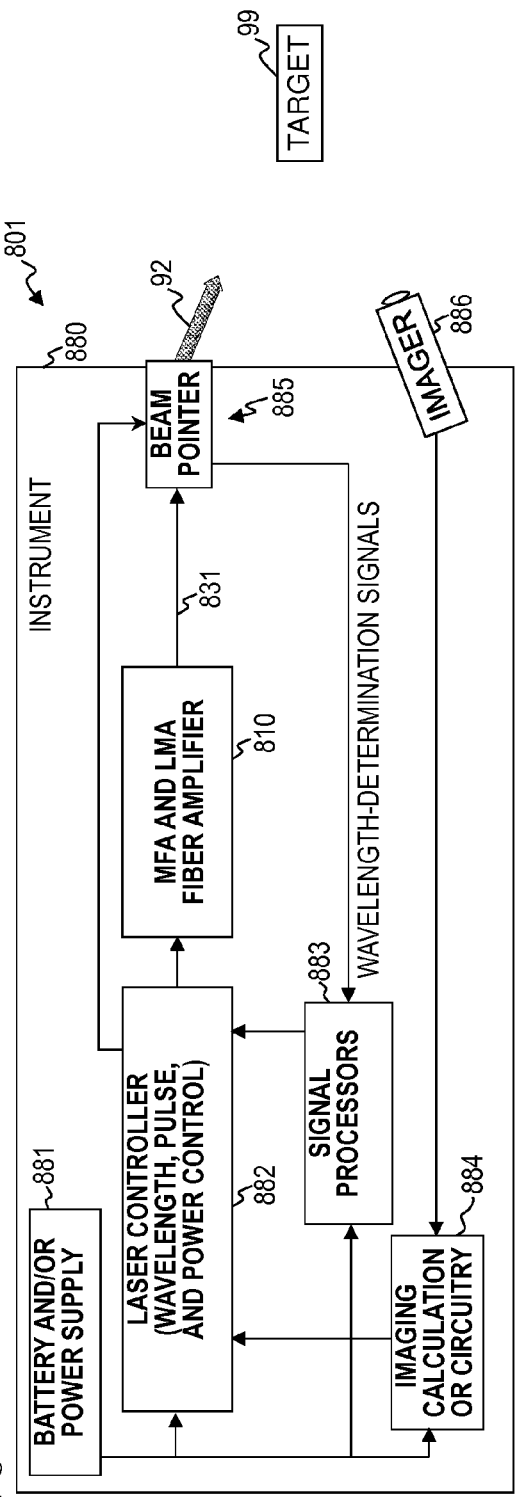
FIG. 8 is a block diagram of an instrument system 801 having a high-power mode-field-adaptor fiber-laser control system using one or more of the mode-field-adaptor fiber-laser systems as described herein.

FIG. 8 is a block diagram of an instrument system 801 having a high-power fiber-laser control system using one or more of the optical subsystems as described herein. In some embodiments, instrument system 801 (e.g., a medical instrument such as a laser scalpel, optical stimulator for evoking nerve-action potentials in nerves of a human, skin or corneal ablator, or other medical instrument, or a material processor instrument (such as for heat treatment of a surface, or welding or cutting) or the like) using one or more of the fiber amplifiers 810 as described herein. In some embodiments, system 801 includes the instrument and/or facility enclosure 880 and its other contents (e.g., engines and control systems), one or more battery and/or electrical power supplies 881, a laser controller 882 that provides the control of wavelength, pulse timing and duration for embodiments using pulse signals (other embodiments use CW signal beams), output-power control, direction control of the output beam and the like, optionally an imaging-calculation microprocessor and/or circuitry 884 that obtains an image signal from imager 886 and calculates such data as target location and size that is then delivered to laser controller 882, one or more signal processor 883 that, in some embodiments, receives wavelength-determination signals and/or directional-drift signals from the beam pointer module 885 (with its associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to laser controller 882. In some embodiments, laser controller 882 generates the control and power signals that are sent to fiber-laser module 200, which then delivers the high-power optical beam to beam pointer module 885, that points and outputs a single output laser beam 92 that is directed toward target 99 (e.g., a tissue of a person to be treated or analyzed, or a material to be conditioned, welded or cut), according to the control information that was generated based on image information obtained from imager 886, or as directed by manual control of the device 880 or its beam pointer 885. In some embodiments, system 801 is part of, and used as an element of, a nerve-stimulation and surgical cutting/ablation medical instrument whose output is automatically controlled to prevent undesired damage to collateral tissue (such as described in commonly assigned U.S. Patent Application Publication 2008/0077200 titled "APPARATUS AND METHOD FOR STIMULATION OF NERVES AND AUTOMATED CONTROL OF SURGICAL INSTRUMENTS" by Bendett et al., which is incorporated herein by reference). In some embodiments, system 801 is an entire system that uses the delivery fiber 831 according to the present invention, and benefits by not allowing reflections from the patient (i.e., the target of the laser radiation from the distal end of the delivery fiber) from traveling back into the delivery fiber and thence into the gain fiber. System 801 also benefits from having an easily replaceable and sterile delivery fiber (such as described above in FIG. 7) that does not need an expensive isolator to provide this isolation function.

In some embodiments, the present invention provides a method for manufacturing an optical delivery fiber having a non-circular core and a connector, such that the delivery fiber is configured to be connected and disconnected to a system (e.g., a medical-treatment laser system, or the like). FIG. 9A is a block diagram of apparatus 901 that includes non-circular core optical delivery fiber 931 and connector 911B, according to some embodiments of the present invention. In some embodiments, connector 911B further includes one or more short radially oriented pegs 960 (used for an insert-twist-lock connection and removal capability) and has a cylindrical hole 962 that extends from connector surface 963 through connector 911B to connector surface 964 configured to accept optical delivery fiber 931. In some embodiments, the diameter of cylindrical hole 962 is slightly larger than the diameter of delivery fiber 931 (e.g., in some embodiments, about 10 microns to 30 microns larger diameter). In some embodiments, the insertion end of hole 962 is flared or chamfered to facilitate insertion of the delivery fiber 931.

FIG. 9B is a block diagram of apparatus 902 that shows non-circular core optical delivery fiber 931 inserted through connector 911B and extending out through connector surface 964 a distance, d, 969. In some embodiments, optical delivery fiber 931 is secured in cylinder 962. In some embodiments, the delivery fiber 931 is secured in hole 962 by laser welding, or using adhesive, solder, or the like. In some embodiments, the exposed end 969 of the delivery fiber 931 is cleaved or polished as described below.

FIG. 9C is a block diagram of apparatus 903 that shows non-circular core optical delivery fiber 931 extending through cylinder 962 of connector 911B such that the end of delivery fiber 931 is coplanar with connector surface 964. In some embodiments, delivery fiber 931 and connector surface 964 are made coplanar by removing the section of delivery fiber 931 that extended beyond connector surface 964 in FIG. 9B. In various embodiments, exposed fiber end section 969 is removed by cleaving, polishing, cutting, or the like, such that the end of the fiber 931 is flush with the inside end of connector 911B.

FIG. 9D is a block diagram of apparatus 904 that shows non-circular core optical delivery fiber 931 attached to connector 911B. Connector 911B is configured to releasably attach to adaptor 911A (in some embodiments, pegs 960 insert and twist into slots 966 in adaptor 911A), and together, connector 911B and adaptor 911A combine to form ferrule 911 which allows delivery fiber 931 to be connected and disconnected to a system capable of outputting laser light. In some embodiments (e.g., laser systems having very high power), the delivery fiber is typically not butt-coupled, as the power levels are too high, and thus in such systems having high average power, a lens is added adjacent the delivery fiber and used to relay an image of the signal beam with a magnification onto the entry end of the delivery fiber, and this image can be greater than one times the spotsize of the signal beam as it exits the gain fiber. In some embodiments, adaptor 911A further includes optical fiber 910 attached to adaptor 911A, diverging lens 975 configured to expand forward-propagating light signal 98 to fill first focusing lens 976 having a first focal length, focusing lens 976 is configured to receive forward-propagating light signal 98 output from plano-concave lens 975 (or other optical element that causes the signal beam to diverge) such that the focused light from focusing lens 976 passes through aperture 977, and a second focusing lens 978 having a second focal length (e.g., a shorter focal length, in some embodiments) is configured to pass the focused signal light 98 received from the first focussing lens 976 and to then focus the signal light 98 onto the core of the delivery fiber 931. In some embodiments, the first focal length of the first focusing lens 976 is substantially longer than the second focal length of the second focusing lens 978. In some embodiments, backward-propagating reflected-light 97 will be substantially blocked or otherwise prevented from traveling from the delivery fiber 931 into optical fiber 910 because the backward-propagating reflected-light 97 will pass through the second focusing lens 978 and, because the second focusing lens 978 has a short focal length, will be substantially blocked by aperture 976. In FIG. 9D, dotted line 95 represents the location of connector side 964 when the connector 911B and the adaptor 911A have been connected together. In some embodiments, optical fiber 910 further includes an integrated beam expanding end cap (e.g., as described in U.S. Pat. No. 7,835,068 titled "PHOTONIC-CRYSTAL-ROD OPTICAL AMPLIFIER WITH SEALED-HOLE ENDCAP AND ASSOCIATED METHOD" that issued Nov. 16, 2010 to Christopher D. Brooks, et al.) to prevent damage to the end of optical fiber 910 due to high-power laser pulses output by the optical fiber 910.

FIG. 10A is a block diagram of apparatus 1001 that includes non-circular core optical delivery fiber 1031 inserted through angled connector 1011B, according to some embodiments of the present invention. FIG. 10A is substantially the same as FIG. 9B, described above, except that connector surface 1064 is not perpendicular to the longitudinal axis of fiber 1031. In some embodiments, the outer connector surface 1063 is substantially perpendicular to the axis of delivery fiber 1031, and the angle between a plane that is perpendicular to the longitudinal axis of fiber 1031 and the plane of inner connector surface 1064 is a suitable angle between about 5 to about 30 degrees.

FIG. 10B is a block diagram of apparatus 1002 that includes non-circular core optical delivery fiber 1031 and angled connector 1011B, according to some embodiments of the present invention. FIG. 10B is substantially the same as FIG. 9C, described above, except that, as described in FIG. 10A above, connector surface 1064 is not perpendicular to the longitudinal axis of fiber 1031 and therefore the end of delivery fiber 1031 is coplanar with connector surface 1064 and is not perpendicular to the longitudinal axis of fiber 1031. In some embodiments, angled connector 1011B is configured to connect to an adaptor 1011A such as shown in FIG. 10C.

As shown in FIG. 10C and FIG. 10D, a plurality of types and geometries of adaptors are used in various embodiments for connecting to angled connectors 1011B, 1011C or 1011D. FIG. 10C is a block diagram of apparatus 1003 that shows non-circular core optical delivery fiber 1031, angled connector 1011C and straight adaptor 1011A, according to some embodiments of the present invention. FIG. 10D is a block diagram of apparatus 1004 that includes non-circular core optical delivery fiber 1031, connector 1011D and straight adaptor 1011A, according to some embodiments of the present invention. In FIG. 10C, connector 1011C (and in FIG. 10D, connector 1011D), the respective connectors are configured to releasably attach to adaptor 1011A, and together, connector 1011C and adaptor 1011A combine to form ferrule 1011 which allows delivery fiber 1031 to be connected and disconnected to a system capable of outputting laser light. (As used herein, the "ferrule" refers to a combination of a "connector" at the end of the fiber, and an "adaptor" on a fixture or enclosure, wherein the adaptor releasably receives and holds the connector.) In some embodiments, adaptor 1011A further includes optical fiber 1010 attached to adaptor 1011A, diverging optical element such as a concave lens 1075 configured to expand forward-propagating light signal 98 to fill a first focusing lens 1076 having a first focal length, wherein focusing lens 1076 is configured to receive forward-propagating light signal 98 output from diverging lens 1075 such that the focused light passes through aperture 1077, and a second focusing lens 1078 having a second focal length that is configured to pass the focused light received from the first focussing lens 1076 and to then focus the signal light 98 onto the core of the delivery fiber 1031. In some embodiments, the first focal length of the first focusing lens 1076 is substantially longer than the second focal length of the second focusing lens 1078. In some embodiments, backward-propagating reflected-light 97 will be substantially prevented from traveling from the delivery fiber 1031 to optical fiber 1010 because the backward-propagating reflected-light 97 will pass through the second focusing lens 1078 and, because the second focusing lens 1078 has a short focal length, will be expanded and the periphery will be substantially blocked by aperture 1076. In FIG. 10 C (and FIG. 10D), dotted line 95 represents the location of connector side 1064 when the connector 1011C (or connector 1011D) and the adaptor 1011A have been connected together. In some embodiments, optical fiber 1010 further includes an integrated beam expanding end cap (e.g., as described in U.S. Pat. No. 7,835,068 titled "PHOTONIC-CRYSTAL-ROD OPTICAL AMPLIFIER WITH SEALED-HOLE ENDCAP AND ASSOCIATED METHOD" that issued Nov. 16, 2010 to Christopher D. Brooks et al.) to prevent damage to the end of optical fiber 1010 due to high-power laser pulses output by the optical fiber 1010.

Figure 11A:
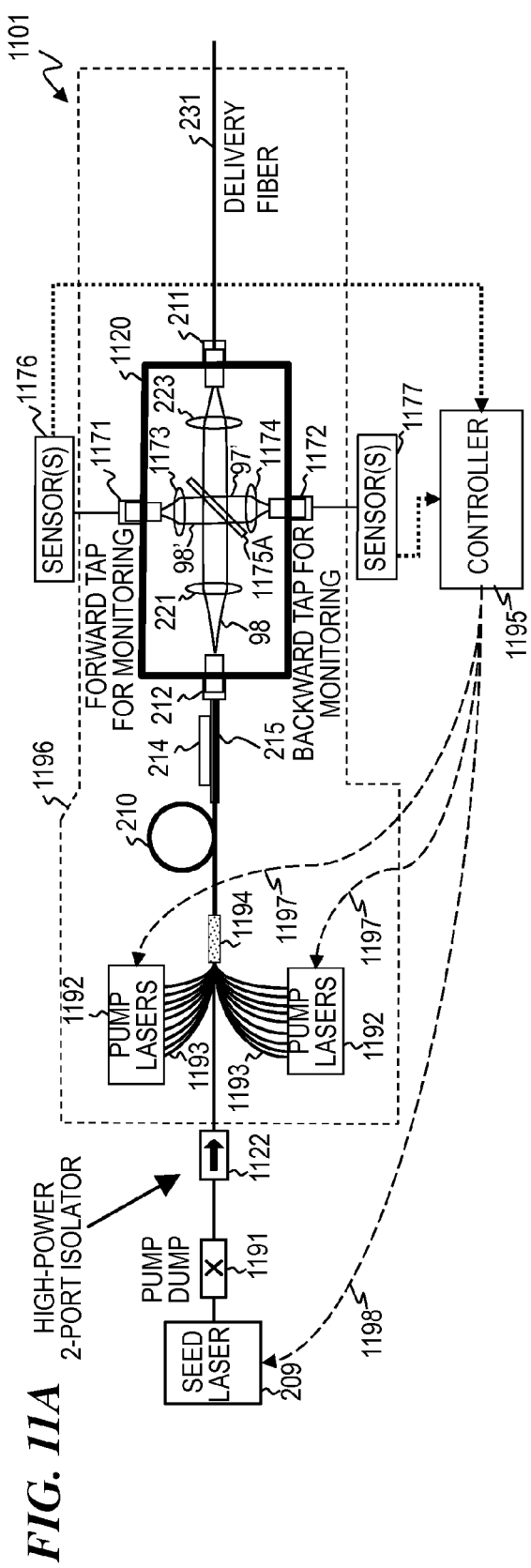
FIG. 11A is a block diagram of an improved optical subsystem 1101 that includes an optical gain fiber 210 having a core interfaced through a feedback-isolation-and-adaptor unit 220 to a multi-mode delivery fiber 231 having a non-circular core, wherein the feedback-isolation-and-adaptor unit 1120 includes mirror 1175A, according to some embodiments of the present invention.

FIG. 11A is a block diagram of an improved optical subsystem 1101 that includes an optical gain fiber 210 having a core interfaced through a feedback-isolation-and-adaptor unit 1120 to a multi-mode delivery fiber 231 having a non-circular core, wherein the feedback-isolation-and-adaptor unit 1120 includes mirror 1175A configured to transmit a majority of forward-propagating amplified signal 98 and to reflect a minority of amplified signal 98 for analysis purposes, according to some embodiments of the present invention. In some embodiments, FIG. 11A is substantially similar to feedback-isolation-and-adaptor unit 220 of FIG. 2, described above, except that additional lenses 223, 1173, and 1174, and mirror 1175A have been added to the feedback-isolation-and-adaptor unit 1120 such that a small portion of forward-propagating amplified signal 98 is reflected to one or more sensors 1176 and a portion of the backward-propagating reflected amplified light 96 is provided to one or more sensors 1177. Delivery fiber 231 is, in some embodiments, is configured according to any of the methods and apparatus described above for FIGS. 2, 3, 4A, 4B, 4C, 4D, 4E, 4F, 4G, 4H, 5A, 5B, 6A, 6B, 6C, 6D, 6E, 6F, 6G, 6H, 6I, 6J, 6K, 6L, 6M, 6N, 6o, 6P, 6Q, 6R, 6S, 6T, 6U, 6V, 7, 8, 9A, 9B, 9C, 9D, 10A, 10B, 10C, or 10D.

In some embodiments, beamsplitting mirror 1175A transmits about 99.5% of the incident amplified signal 98 and reflects about 0.5% of the incident amplified signal. In some other embodiments, mirror 1175A transmits about 99.0% of the incident amplified signal 98 and reflects about 1.0% of the incident amplified signal. In some other embodiments, mirror 1175A transmits about 98.5% of the incident amplified signal 98 and reflects about 1.5% of the incident amplified signal. In some other embodiments, mirror 1175A transmits about 98.0% of the incident amplified signal 98 and reflects about 2.0% of the incident amplified signal. In some other embodiments, mirror 1175A transmits about 95.0% of the incident amplified signal 98 and reflects about 5.0% of the incident amplified signal. In some other embodiments, mirror 1175A transmits about 90.0% of the incident amplified signal 98 and reflects about 10.0% of the incident amplified signal.

In some embodiments, feedback-isolation-and-adaptor unit 1120 includes focusing lens 1173 configured to focus the reflected portion 98' of the amplified light 98 that is reflected from mirror 1175A into ferrule 1171 in order to provide the reflected portion 98' to the one or more sensors 1176. In some embodiments, feedback-isolation-and-adaptor unit 1120 further includes focusing lens 1174 configured to focus the reflected portion 97' of light reflected by mirror 1175A from a backward-propagating signal 97 into ferrule 1172 in order to provide the reflected light to one or more sensors 1177. In some embodiments, mirror 1175A provides the ability to simultaneously tap forward-propagating and backward-propagating optical signals in optic laser system 1101 for sensing, analysis and/or control (e.g., in some embodiments, the tapped signals are used to control a feedback loop that controls operation of laser system 1101).

In some embodiments, optical laser system 1101 further includes a seed source 209 (e.g., in some embodiments, seed source 209 includes a laser such as a diode laser or an optical-fiber laser that is optically pumped using light from a diode-laser system) that generates an optical seed signal (in other embodiments, a controlled-bandwidth ASE source is used for generating the seed signal, such as described in U.S. Pat. No. 7,539,231 issued May 26, 2009 to Eric C. Honea et al. titled "Apparatus and method for generating controlled-linewidth laser-seed-signals for high-powered fiber-laser amplifier systems," which is incorporated herein by reference). In some embodiments, an optical fiber carrying seed signal is connected between seed source 209 and the input port of a pump dump 1191, which passes light of the wavelength of the seed signal but which "dumps" (blocks, diverts or otherwise absorbs) light of the wavelength of the pump light from seed laser 209 or backward-propagating pump light from optical power amplifier 1196 (also called an optical-amplifier subsystem 1196). In some embodiments, system 1101 omits a two-port optical isolator 1122 that would be used for isolating high-power optical signals (e.g., in various embodiments, such high-power pulses are pulses having a peak power of at least 1000 watts, or even at least 10,000 watts, at least 100,000 watts, or even at least 1,000,000 watts); and instead uses the isolation techniques and mechanisms as described in FIGS. 2, 3, 4A, 4B, 4C, 4D, 4E, 4F, 4G, 4H, 5A, 5B, 6A, 6B, 6C, 6D, 6E, 6F, 6G, 6H, 6I, 6J, 6K, 6L, 6M, 6N, 6o, 6P, 6Q, 6R, 6S, 6T, 6U, 6V, 7, 8, 9A, 9B, 9C, 9D, 10A, 10B, 10C, or 10D. In other embodiments, isolator 1122 is included and supplements those additional isolation techniques and mechanisms. In some embodiments, system 1101 also includes a power optical amplifier 1196 that is capable of amplifying (and which, when supplied with suitable seed signals and optical pump light, does amplify) high-power optical signals (e.g., such that, in various embodiments, the output pulses have a peak power of at least 10,000 watts, or at least 100,000 watts or even at least 1,000,000 watts).

In some embodiments, power amplifier 1196 includes a plurality of pump lasers 1192 that are connected by optical fibers 1193 to a pump combiner 1194 that inserts the seed signal into a core of gain fiber 210. In some embodiments, a "backward tap" to obtain a portion of any backward-propagating light coming from delivery fiber 231 is provided, and this backward-propagating light is coupled to one or more sensors 1177. In some embodiments, the sensors 1177 generate one or more electrical signals to controller 1195 that are each indicative of the different respective optical properties of the backward-tap signal that were measured by sensors 1177.

In some embodiments, sensors 1176 receive a portion of the forward-propagating light coming from gain fiber 210 and generate one or more electrical signals to controller 1195 that are each indicative of the different respective optical properties of the forward-tap signal that were measured by sensors 1176. In some embodiments, controller 1195 is used to control one or more operations of system 1101 (e.g., in some embodiments, controller 1195 can turn off the electrical power to the pump lasers 1192 via electrical control or power line(s) 1197, and/or can alter the operation of the seed source 209 via electrical control or power line(s) 1198 (e.g., in some embodiments, if the backward tap and sensors 1177 indicate excess reflected power (or ASE (amplified spontaneous emission) or SBS (stimulated Brillouin scattering) or other noise from downstream optical amplifiers) from delivery fiber 231 into the gain fiber 210, controller 1195 can force the seed source 209 to emit a continuous-wave (CW) signal that would bleed the excess stored energy from the gain fiber).

Figure 11B:
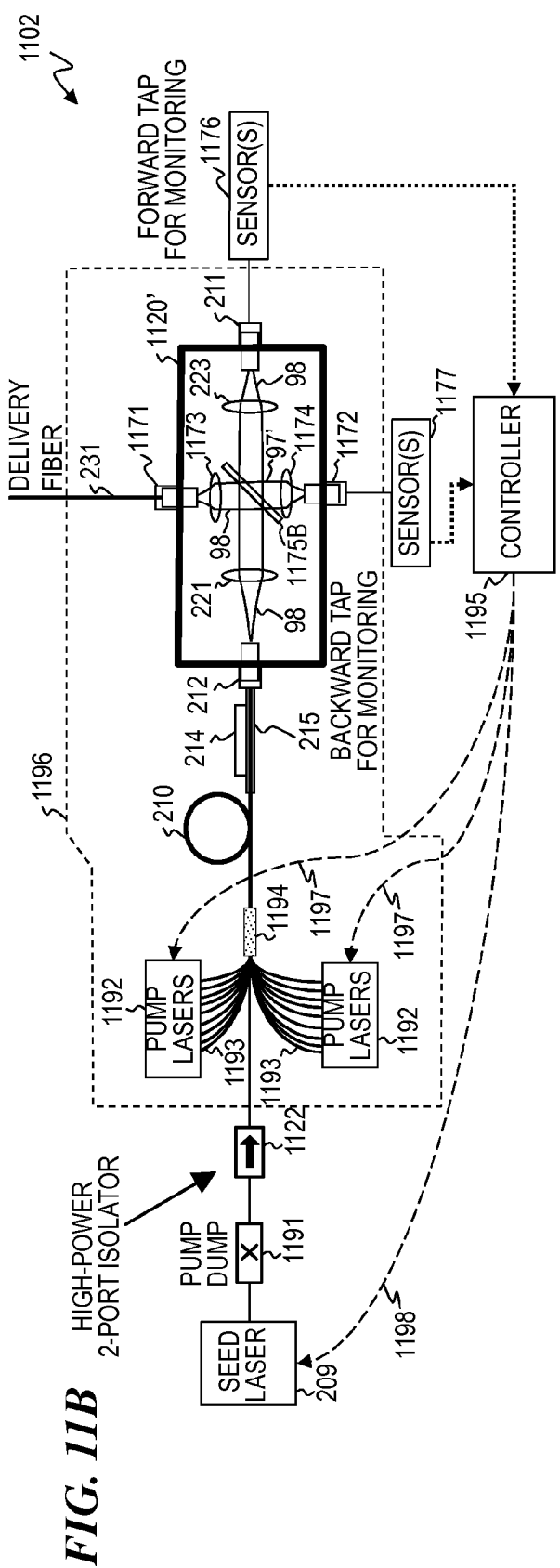
FIG. 11B is a block diagram of an improved optical subsystem 1102 that includes an optical gain fiber 210 having a core interfaced through a feedback-isolation-and-adaptor unit 220 to a multi-mode delivery fiber 231 having a non-circular core, wherein the feedback-isolation-and-adaptor unit 1120' includes mirror 1175B, according to some embodiments of the present invention.

FIG. 11B is a block diagram of an improved optical laser system 1102 that includes an optical gain fiber 210 having a core interfaced through a feedback-isolation-and-adaptor unit 1120' to a multi-mode delivery fiber 231 having a non-circular core, wherein the feedback-isolation-and-adaptor unit 1120' includes mirror 1175B, according to some embodiments of the present invention. In some embodiments, optical laser system 1102 is substantially similar to optical laser system 1101 shown in FIG. 11A and described above expect that mirror 1175B of FIG. 11B is configured to reflect a majority of forward-propagating amplified signal 98 and to transmit a minority portion 98' of the amplified signal 98 for analysis purposes, according to some embodiments of the present invention. In some embodiments, reflecting a majority of the forward-propagating amplified signal 98 with mirror 1175B, as opposed to passing a majority of the amplified signal 98 through mirror 1175B, prevents the possible overheating of the mirror 1175B and distortion and degradation of the amplified optical signal 98 due to mirror 1175B absorbing power from amplified signal 98.

In some embodiments, mirror 1175B reflects about 99.5% of the incident amplified signal 98 and transmits about 0.5% of the incident amplified signal. In some other embodiments, mirror 1175B reflects about 99.0% of the incident amplified signal 98 and transmits about 1.0% of the incident amplified signal. In some other embodiments, mirror 1175B reflects about 98.5% of the incident amplified signal 98 and transmits about 1.5% of the incident amplified signal. In some other embodiments, mirror 1175B reflects about 98.0% of the incident amplified signal 98 and transmits about 2.0% of the incident amplified signal. In some other embodiments, mirror 1175B reflects about 95.0% of the incident amplified signal 98 and transmits about 5.0% of the incident amplified signal. In some other embodiments, mirror 1175B reflects about 90.0% of the incident amplified signal 98 and transmits about 10.0% of the incident amplified signal.

In some embodiments, the non-circular core of the deliver fiber is defined by photonic crystal structures such as U.S. Patent Publication 2003/0165313 by Broeng et al., which published Sep. 4, 2003 titled "Optical fibre with high numerical aperture, method of its production, and use thereof" which is incorporated herein by reference, (except having a non-circular core defined by the photonic crystal structures) or such as longitudinal holes similar to those as described in U.S. Pat. No. 7,391,561 titled "Fiber- or rod-based optical source featuring a large-core, rare-earth-doped photonic-crystal device for generation of high-power pulsed radiation and method" that issued Jun. 24, 2008 to Fabio Di Teodoro et al., except using larger hole sizes and/or smaller hole spacings (in order to create a large numerical aperture and thus promote mixing and/or multimode propagation) and having substantially no doping with species that absorb light of the signal wavelength. A PCF (photonic-crystal fiber) core having relatively small photonic-crystal holes and relatively large hole-to-hole spacings will have a relatively low numerical aperture and is typically single moded and the concept of isolation used in some embodiments of the present invention is based on a multimode core. In some embodiments, the photonic crystal structures define a non-circular core having a relatively high numerical aperture.

In some embodiments, the present invention provides a method that includes amplifying an optical signal in an optical-gain-fiber subsystem, wherein the optical-gain-fiber subsystem includes an output end, outputting the amplified optical signal in a forward-propagating direction from the output end of the optical-gain-fiber subsystem as a high-brightness optical beam having a first Rayleigh range, receiving the amplified optical signal from the output end of the optical-gain-fiber subsystem into a first end of a delivery fiber having a non-circular waveguide core, wherein the delivery fiber is interfaced to the optical-gain-fiber subsystem, outputting the amplified optical signal from a second end of the delivery fiber wherein the delivery fiber includes a non-circular waveguide core, and, without the use of a non-linear optical isolator, inhibiting light traveling in a backward-propagating direction in the delivery fiber from entering the optical-gain-fiber subsystem in the backward-propagating direction.

In some embodiments of the method, inhibiting of light traveling in a backward-propagating direction further includes offsetting a light-propagation axis of light exiting the output end of the optical-gain-fiber subsystem from a light-propagation axis of light exiting the first end of the delivery fiber relative to one another such that a majority of the light traveling in the backward-propagating direction and emitted from the first end of the delivery fiber does not enter a core of the optical-gain-fiber subsystem.

In some embodiments of the method, the light traveling in the backward-propagating direction in the delivery fiber that exits the first end of the delivery fiber toward the optical-gain-fiber subsystem has a second Rayleigh range that is shorter than the first Rayleigh range of the optical signal output from the optical-gain-fiber subsystem.

Some embodiments of the method further include providing an aperture located between the output end of the optical-gain-fiber subsystem and the first end of the delivery fiber, passing a majority of the forward-propagating optical signal through the aperture, blocking a majority portion of the light traveling in the backward-propagating direction that exits the first end of the delivery fiber toward the optical-fiber amplifier subsystem, and preventing a majority portion of the light traveling in the backward-propagating direction from entering the output end of the optical-gain-fiber subsystem.

Some embodiments of the method further include providing an endcap attached to the first end of the delivery fiber, providing an aperture in the endcap and located between the output end of the optical-gain-fiber subsystem and the first end of the delivery fiber, passing a majority of the forward-propagating optical signal through the aperture, blocking a majority portion of the light traveling in the backward-propagating direction that exits the first end of the delivery fiber toward the optical-fiber amplifier subsystem; and, preventing a majority portion of the light traveling in the backward-propagating direction from entering the output end of the optical-gain-fiber subsystem.

Some embodiments of the method further include providing a first lens and a second lens separated by a first distance, optically coupling the first lens to the output end of the optical-gain-fiber subsystem and to the second lens, optically coupling the second lens to the first lens and to the first end of the delivery fiber, collimating the forward-propagating optical signal from the optical-gain-fiber subsystem using the first lens, and receiving the collimated forward-propagating optical signal from the first lens and focusing the forward-propagating optical signal using the second lens such that the forward-propagating optical signal enters the first end of the delivery fiber.

In some embodiments of the method, the first distance is greater than the second Rayleigh range, and the first distance is not greater than the first Rayleigh range. In other embodiments of the method, the first distance is greater than the second Rayleigh range, and the first distance is less than the first Rayleigh range.

Some embodiments of the method further include providing a reflecting optical element located between the first lens and the second lens, reflecting the forward-propagating optical signal and the light traveling in the backward-propagating direction using the reflecting optical element in order to increase a distance the forward-propagating optical signal and the light traveling in the backward-propagating direction travel between the first lens and the second lens.

Some embodiments of the method further include folding an optical path of the forward-propagating light between the first lens and the second lens.

Some embodiments of the method further include providing a reflecting optical element located between the optical-gain-fiber subsystem and the delivery fiber, reflecting the forward-propagating optical signal and the light traveling in the backward-propagating direction using the reflecting optical element in order to increase a distance the forward-propagating optical signal and the light traveling in the backward-propagating direction travel between the optical-gain-fiber subsystem and the delivery fiber.

Some embodiments of the method further include providing a reflecting optical element located between the optical-gain-fiber subsystem and the delivery fiber, reflecting the forward-propagating optical signal and the light traveling in the backward-propagating direction using the reflecting optical element in order to shorten a footprint of the optical-gain-fiber subsystem while providing a suitable distance the forward-propagating optical signal and the light traveling in the backward-propagating direction travel between the optical-gain-fiber subsystem and the delivery fiber. In some embodiments, the suitable distance is a distance that is longer than a spacing between the optical-gain-fiber subsystem and the delivery fiber.

Some embodiments of the method further include folding an optical path between the optical-gain-fiber subsystem and the delivery fiber.

In some embodiments of the method, the delivery fiber has a sufficiently large numerical aperture such that substantially all of the light output from the optical-gain-fiber subsystem enters the non-circular core of the delivery fiber.

In some embodiments of the method, the numerical aperture of the delivery fiber is between about 0.2 and about 0.6.

In some embodiments, the present invention provides an apparatus that includes an optical-fiber amplifier subsystem configured to amplify an optical signal, wherein the optical-fiber amplifier subsystem includes an output end, and wherein the output end of the optical-fiber amplifier subsystem is configured to output the optical signal in a forward-propagating direction as a high-brightness optical beam having a first Rayleigh range, and a delivery fiber that has an interface to the optical-fiber amplifier subsystem and that has a first end and a second end, wherein the delivery fiber is configured to receive the optical signal from the output end of the optical-fiber amplifier subsystem into the first end of the delivery fiber, and wherein the delivery fiber is configured to output the optical signal from the second end of the delivery fiber, wherein the delivery fiber includes a non-circular waveguide core, and wherein the apparatus is configured such that light traveling in a backward-propagating direction in the delivery fiber is substantially prevented from entering the optical-fiber amplifier subsystem in the backward-propagating direction.

In some embodiments, the apparatus is configured such that an axis of the output end of the optical-fiber amplifier subsystem and an axis of the first end of the delivery fiber are offset relative to one another such that a majority of the light traveling in the backward-propagating direction and emitted from the first end of the delivery fiber does not enter a core of the optical-fiber amplifier subsystem.

In some embodiments, the light traveling in the backward-propagating direction in the delivery fiber that exits the first end of the delivery fiber toward the optical-fiber amplifier subsystem has a second Rayleigh range that is shorter than the first Rayleigh range of the forward-propagating optical signal output from the optical optical-fiber amplifier subsystem.

In some embodiments, the apparatus is configured such that an optical axis of the output end of the optical amplifier and an axis of the first end of the delivery fiber are aligned offset relative to one another such that a majority of light reflected from the second end of the delivery fiber and emitted from the first end of the delivery fiber does not enter a core of the optical-amplifier subsystem.

In some embodiments, the apparatus further includes an aperture located between the output end of the optical-fiber amplifier subsystem and the first end of the delivery fiber, wherein the aperture is configured to pass a majority of the forward-propagating optical signal through the aperture and wherein the aperture is configured to block a majority portion of the light traveling in the backward-propagating direction that exits the first end of the delivery fiber toward the optical-fiber amplifier subsystem from entering the output end of the optical-fiber amplifier subsystem.

In some embodiments, the apparatus further includes a first lens optically coupled to the output end of the optical-fiber amplifier subsystem, wherein the first lens is configured to substantially collimate the forward-propagating optical signal from the optical-fiber amplifier subsystem, a second lens optically coupled to the first end of the delivery fiber, wherein the second lens is configured to receive the collimated forward-propagating optical signal from the first lens and to focus the forward-propagating optical signal such that the forward-propagating optical signal enters the first end of the delivery fiber, and wherein the first lens and the second lens are separated by a first distance.

In some embodiments, the first distance is greater than the second Rayleigh range, and the first distance is not greater than the first Rayleigh range.

In some embodiments, the first distance is greater than the second Rayleigh range, and the first distance is less than the first Rayleigh range.

In some embodiments, the apparatus further includes a reflecting optical element located between the optical-fiber amplifier subsystem and the delivery fiber, wherein the reflecting optical element is configured to provide at least one reflection of the forward-propagating optical signal and of the light traveling in the backward-propagating direction in order to fold an optical path of the forward-propagating optical signal and of the light traveling in the backward-propagating direction between the optical-fiber amplifier subsystem and the delivery fiber.

In some embodiments, the apparatus further includes a reflecting optical element located between the first lens and the second lens, wherein the reflecting optical element is configured to provide at least one reflection of the forward-propagating optical signal and of the light traveling in the backward-propagating direction in order to fold an optical path of the forward-propagating optical signal and of the light traveling in the backward-propagating direction between the first lens and the second lens.

In some embodiments, the delivery fiber is configured to have a sufficiently large numerical aperture (e.g., in some embodiments, an NA that is no less than 0.1) such that substantially all of the light output from the signal fiber enters the non-circular core of the delivery fiber.

In some embodiments, the apparatus further includes a partially reflecting mirror located between the first lens and the second lens, wherein the partially reflecting mirror is configured to reflect a minority portion of the collimated forward-propagating optical signal from the first lens to a first sensor and to transmit a majority portion of the collimated forward-propagating optical signal to the second lens, and wherein the reflecting mirror is further configured to reflect a minority portion of the light traveling in the backward-propagating direction to a second sensor.

In some embodiments, the apparatus further includes a partially reflecting mirror located between the first lens and the second lens, wherein the partially reflecting mirror is configured to reflect a majority portion of the collimated forward-propagating optical signal from the first lens to the second lens, and wherein the reflecting mirror is further configured to transmit a minority portion of the forward-propagating light toward a first sensor and to transmit a minority portion of the backward-propagating optical signal to a second sensor.

In some embodiments, the present invention provides a method that includes providing a delivery fiber assembly having a reverse endcap and a fiber portion, optically coupling the reverse endcap and the fiber portion, wherein the reverse endcap has a solid first core having a first core diameter, wherein the fiber portion has a non-circular second core having a second core diameter; and wherein the first core diameter is larger than the second core diameter.

Some embodiments of the method further include receiving a forward-propagating optical signal into the solid first core of the reverse endcap, passing a majority of the forward-propagating optical signal into the non-circular second core with substantially no degradation in brightness, wherein light traveling in a backward-propagating direction has a brightness that is degraded by the reverse endcap.

Some embodiments of the method further include providing an optical-amplifier subsystem, wherein the optical-amplifier subsystem has an output adaptor attaching a connector to the first endcap of the delivery fiber, wherein the adaptor and the connector are configured to releasably connect and disconnect with each other.

Some embodiments of the method further include providing a removable sterile enclosure, inserting the delivery fiber into the removable sterile enclosure, sealing the removable sterile enclosure and sterilizing both such that the delivery fiber is kept in a sterile condition until use, and wherein the delivery fiber is replaceably connectable to the optical-amplifier subsystem, and wherein the delivery fiber is optionally disposable.

In some embodiments of the method, the first endcap has a multi-mode core and the fiber portion has a multi-mode core.

In some embodiments of the method, the non-circular second core has a substantially polygonal-shaped.

In some embodiments of the method, the first endcap and the fiber portion delivery fiber each have a sufficiently large numerical aperture such that substantially all of the forward-propagating optical signal enters the non-circular core of the fiber portion.

In some embodiments of the method, the numerical aperture of the delivery fiber is between about 0.2 and about 0.3. In some embodiments of the method, the numerical aperture of the delivery fiber is between about 0.3 and about 0.4. In some embodiments of the method, the numerical aperture of the delivery fiber is between about 0.4 and about 0.5. In some embodiments of the method, the numerical aperture of the delivery fiber is between about 0.5 and about 0.6.

In some embodiments of the method, the non-circular second core has a substantially square shape.

In some embodiments of the method, the non-circular second core includes a substantially oval shape.

In some embodiments, the present invention provides an apparatus that includes a delivery fiber having a reverse endcap and a fiber portion optically coupled to the reverse endcap, wherein the reverse endcap has a solid first core having a first core diameter, wherein the fiber portion has a non-circular second core having a second core diameter, and wherein the first core diameter is larger than the second core diameter.

In some embodiments of the apparatus, the delivery fiber is configured to receive a forward-propagating optical signal into the solid first core of the reverse endcap and pass a majority of the forward-propagating optical signal into the non-circular second core with substantially no degradation in brightness, while the reverse endcap does degrade brightness of light traveling in a backward-propagating direction opposite the forward-propagating optical signal.

In some embodiments of the apparatus, the apparatus further includes an optical-amplifier subsystem having an output adaptor mechanically connected to the optical-amplifier subsystem, wherein the delivery fiber has a connector mechanically connected to the delivery fiber, and wherein the adaptor and the connector are configured to releasably connect to and disconnect from each other.

In some embodiments of the apparatus, the first endcap has a multi-mode core and the fiber portion has a multi-mode core.

In some embodiments of the apparatus, the apparatus further includes a removable sterile enclosure surrounding the delivery fiber for holding the delivery fiber in a sterile condition until use, wherein the delivery fiber is replaceably connectable to the optical-amplifier subsystem, and wherein the delivery fiber is disposable.

In some embodiments of the apparatus, the non-circular second core has a substantially polygonal-shaped.

In some embodiments of the apparatus, the first endcap and the fiber portion delivery fiber each have a sufficiently large numerical aperture such that substantially all of the forward-propagating optical signal enters the non-circular core of the fiber portion. In some embodiments, the numerical aperture of the delivery fiber is between about 0.2 and about 0.3. In some embodiments, the numerical aperture of the delivery fiber is between about 0.3 and about 0.4. In some embodiments, the numerical aperture of the delivery fiber is between about 0.4 and about 0.5. In some embodiments, the numerical aperture of the delivery fiber is between about 0.5 and about 0.6. In some embodiments, the numerical aperture of the delivery fiber is between about 0.6 and about 0.75.

In some embodiments of the apparatus, the non-circular second core has a substantially square shape.

In some embodiments of the apparatus, the non-circular second core has a substantially oval shape.

In some embodiments of the apparatus, the non-circular second core has a substantially polygonal-shaped.

In some embodiments of the apparatus, the non-circular second core is defined by and surrounded by an airclad region.

In some embodiments of the apparatus, the non-circular second core includes stress rods.

In some embodiments, the present invention provides an apparatus that includes for delivering a forward-propagating signal to a destination from a signal-providing fiber having an output end, the apparatus comprising, a delivery fiber having a first end and a second end, wherein forward-propagating light travels to the second end from the first end and backward-propagating light travels to the first end from the second end, and wherein the delivery fiber includes a non-circular waveguide core and a cladding layer surrounding the non-circular waveguide core, and a first endcap that is connected to the first end of the delivery fiber, wherein the endcap operates to pass a majority of forward-propagating signal light output from the signal-providing fiber into the delivery fiber and pass less than a majority of backward-propagating light into the output end of the signal-providing fiber from the second end of the delivery fiber. In some embodiments, the endcap operates to pass at least 60% of the forward-propagating signal light output and pass no more than 40% of backward-propagating light. In some embodiments, the endcap operates to pass at least 70% of the forward-propagating signal light output and pass no more than 30% of backward-propagating light. In some embodiments, the endcap operates to pass at least 80% of the forward-propagating signal light output and pass no more than 20% of backward-propagating light. In some embodiments, the endcap operates to pass at least 90% of the forward-propagating signal light output and pass no more than 10% of backward-propagating light. In some embodiments, the endcap operates to pass at least 95% of the forward-propagating signal light output and pass no more than 5% of backward-propagating light. In some embodiments, the endcap operates to pass at least 98% of the forward-propagating signal light output and pass no more than 2% of backward-propagating light.

In some embodiments, the endcap includes an aperture, wherein the aperture passes the majority of forward-propagating signal light that is output from the signal-providing fiber into the delivery fiber and wherein the aperture blocks a majority of the backward-propagating signal light. In some embodiments, the aperture operates to pass at least 60% of the forward-propagating signal light output and pass no more than 40% of backward-propagating light. In some embodiments, the aperture operates to pass at least 70% of the forward-propagating signal light output and pass no more than 30% of backward-propagating light. In some embodiments, the aperture operates to pass at least 80% of the forward-propagating signal light output and pass no more than 20% of backward-propagating light. In some embodiments, the aperture operates to pass at least 90% of the forward-propagating signal light output and pass no more than 10% of backward-propagating light. In some embodiments, the aperture operates to pass at least 95% of the forward-propagating signal light output and pass no more than 5% of backward-propagating light. In some embodiments, the aperture operates to pass at least 98% of the forward-propagating signal light output and pass no more than 2% of backward-propagating light.

In some embodiments of the apparatus, the non-circular waveguide core is defined by and surrounded by an air-clad region.

In some embodiments of the apparatus, the non-circular waveguide core includes stress-rods.

In some embodiments of the apparatus, the non-circular waveguide core has a shape that is substantially polygonal.

In some embodiments of the apparatus, the non-circular waveguide core has a shape that is substantially square.

In some embodiments of the apparatus, the non-circular waveguide core has a shape that is substantially oval.

In some embodiments, an optical axis of the first end of the delivery fiber is tilted relative to an optical axis of the output end of the signal-providing fiber in order to reduce back reflected light from the delivery fiber from entering the signal-providing fiber.

In various embodiments, the tilt angle is substantially 1°, or substantially 2°, or substantially 3°, or substantially 4°, or substantially 5°, or substantially 6°, or substantially 7°, or substantially 8°, or substantially 9°, or substantially 10°. In some embodiments, the tilt angle is at least 5°, or at least 10°, or at least 15°, or at least 20°.

In some embodiments, a central optical axis of the first end of the delivery fiber is substantially parallel but laterally offset relative to a central optical axis of the output end of the signal-providing fiber in order to reduce back reflected light from the delivery fiber from entering the signal-providing fiber.

In various embodiments, the lateral offset amount between the central optical axis of the first end of the delivery fiber and the central optical axis of the output end of the signal-providing fiber is at least 5 microns, or at least 10 microns, or at least 15 microns, or at least 20 microns, or at least 25 microns, or at least 30 microns, or at least 35 microns, or at least 40 microns, or at least 45 microns, or at least 50 microns, or at least 75 microns, or at least 100 microns, or at least 250 microns.

In some of the embodiments, the delivery fiber is configured to have a sufficiently large numerical aperture such that substantially all of the light output from the signal fiber enters the non-circular core of the delivery fiber.

In various ones of the embodiments, the numerical aperture of the delivery fiber is between about 0.1 and about 0.6, between about 0.1 and about 0.12, between about 0.12 and about 0.15, between about 0.1 and about 0.15, between about 0.15 and about 0.2, between about 0.2 and about 0.3, between about 0.3 and about 0.4, between about 0.4 and about 0.5, between about 0.5 and about 0.6, or between about 0.6 and about 0.7. In general, by using non-circular fibers the NA fills very fast, i.e. in a short distance. For circular fibers the fundamental mode can propagate a long distance and then one should specify the NA of the fundamental mode.

In various ones of the embodiments, the numerical aperture of the output end of the signal source is about 0.01, about 0.02, about 0.05, about 0.1, about 0.12, about 0.15, about 0.18, about 0.2, about 0.25, about 0.3, or larger than about 0.3.

In some of the embodiments, the delivery fiber is configured to propagate a plurality of modes of light through the delivery fiber (i.e., in some embodiments, the delivery fiber is a multimode fiber).

In some of the embodiments, the entry aperture of the delivery fiber is non-circular.

In some of the embodiments, the entry aperture of the delivery fiber is laterally offset from an optical axis of the endcap.

In some of the embodiments, the entry aperture is non-centered with respect to the longitudinal axis of the non-circular core of the delivery fiber.

In some of the embodiments, the delivery fiber is connectorized and disposable.

In some of the embodiments, the delivery fiber is sterilized and enclosed in a sealed removable package.

Some embodiments of the apparatus further include an optical-amplifier subsystem having a first output connector mechanically connected to the optical-amplifier subsystem, wherein the delivery fiber has a second connector mechanically connected to delivery fiber, and wherein the first connector and the second connector are configured to releasably connect and disconnect with each other.

Some embodiments of the apparatus further include a medical instrument that includes an electrical power supply, a controller operably coupled to receive power from the electrical power supply, an optical-signal source operably coupled to be controlled by the controller and having a first output connector mechanically connected to the optical-signal source, wherein the delivery fiber has a second connector mechanically connected to delivery fiber, and wherein the first connector and the second connector are configured to releasably connect and disconnect with each other.

In some embodiments, the present invention provides a system that includes an optical-fiber amplifier subsystem that amplifies an optical signal, wherein the optical-fiber amplifier subsystem includes an output end, and wherein the output end is outputs the optical signal; and a delivery fiber having a first end and a second end, wherein the delivery fiber receives the optical signal from the output end of the optical-fiber amplifier subsystem into the first end of the delivery fiber and outputs the optical signal from the second end of the delivery fiber, wherein the delivery fiber includes a non-circular waveguide core.

In some embodiments of the system, light traveling in the backward-propagating direction from the second end of the delivery fiber toward the first end of the delivery fiber exits the first end of the delivery fiber toward the output end of the optical-amplifier subsystem having a reflected-light-signal Rayleigh range that is shorter than the first Rayleigh range of the optical beam of the optical-amplifier subsystem.

In some embodiments, the system is configured such that a longitudinal axis of the output end of the optical-amplifier subsystem and a longitudinal axis of the first end of the delivery fiber are aligned offset relative to one another such that a majority of light traveling in the backward-propagating direction and emitted from the first end of the delivery fiber does not enter a core of the optical-amplifier subsystem.

In some embodiments, the system is configured such that an axis of the output end of the optical-amplifier subsystem and an axis of the first end of the delivery fiber are aligned offset relative to one another such that a majority of light reflected from the second end of the delivery fiber and emitted from the first end of the delivery fiber does not enter a core of the optical-amplifier subsystem.

In some embodiments, the present invention provides a method for delivering a forward-propagating signal to a destination from a signal-providing fiber having an output end through a delivery fiber, the method including providing the delivery fiber, the delivery fiber having a first end and a second end, wherein forward-propagating light in the delivery fiber travels to the second end from the first end and backward-propagating light travels to the first end from the second end, wherein the delivery fiber includes a non-circular waveguide core, a cladding layer surrounding the non-circular waveguide core, and a first endcap that is connected to the first end of the delivery fiber, and wherein the delivery fiber and the endcap are free of any non-linear optical isolator. This method further includes passing a majority of forward-propagating signal light output from the signal-providing fiber into the delivery fiber; and passing less than a majority of light of back-reflected light into the output end of the signal-providing fiber from the second end of the delivery fiber.

In some embodiments of the method, the forward-propagating signal light is not optically isolated with non-linear optics. In some embodiments of the method, the providing of the delivery fiber includes forming the non-circular waveguide core having a shape that is substantially polygonal. In some embodiments of the method, the providing of the delivery fiber includes forming the non-circular waveguide core having a shape that is substantially square. In some embodiments of the method, the providing of the delivery fiber includes forming the non-circular waveguide core having a shape that is substantially oval.

In some embodiments of the method, the providing of the delivery fiber includes tilting an optical axis of the first end of the delivery fiber relative to an optical axis of the output end of the signal-providing fiber in order to reduce back reflected light from the delivery fiber from entering the signal-providing fiber. In some other embodiments of the method, the providing of the delivery fiber includes positioning a central optical axis of the first end of the delivery fiber to be substantially parallel but laterally offset relative to a central optical axis of the output end of the signal-providing fiber in order to reduce back reflected light from the delivery fiber from entering the signal-providing fiber.

In some embodiments of the method, the providing of the delivery fiber includes providing the delivery fiber with a sufficiently large numerical aperture such that substantially all of the light output from the signal fiber enters the non-circular core of the delivery fiber. In some embodiments of the method, the numerical aperture of the delivery fiber is between about 0.2 and about 0.3. In some embodiments of the method, the numerical aperture of the output end of the signal source is between about 0.01 and about 0.15.

In some embodiments of the method, the passing of the majority of forward-propagating signal light output includes propagating multiple modes of light through the delivery fiber. In some embodiments of the method, the providing of the delivery fiber includes making the entry aperture of the delivery fiber non-circular.

In some embodiments, the method further includes laterally offsetting the entry aperture of the delivery fiber from a central optical axis of the endcap. In some embodiments, the method further includes non-centering the entry aperture with respect to the non-circular core of the delivery fiber. In some embodiments, the method further includes connectorizing the delivery fiber, wherein the delivery fiber is single-use and disposable. In some embodiments, the method further includes sterilizing the delivery fiber and enclosing the delivery fiber in a sealed removable package. In some such embodiments, the sterilizing of the delivery fiber is done after the enclosing of the delivery fiber in a sealed removable package. In some embodiments, the delivery fiber is then stored until needed, then removed from the package, attached to the gain fiber, and used.

In some embodiments, the method further includes providing an optical-amplifier subsystem having a first output connector mechanically connected to the optical-amplifier subsystem; mechanically connecting a second connector to the delivery fiber; and releasably connecting the first connector and the second connector with each other.

In some embodiments, the method further includes providing a medical instrument that includes: an electrical power supply, a controller operably coupled to receive power from the electrical power supply, an optical-signal source operably coupled to be controlled by the controller and having a first output connector mechanically connected to the optical-signal source, mechanically connecting a second connector to the delivery fiber; and releasably connecting the first connector and the second connector with each other.

In some embodiments, the present invention provides an apparatus that includes means for amplifying an optical signal, the means (as described herein and equivalents thereof) for amplifying having an output end; means (as described herein and equivalents thereof) for outputting the amplified optical signal in a forward-propagating direction from the output end as a high-brightness optical beam having a first Rayleigh range; non-circular waveguide means for delivering an optical signal; means (as described herein and equivalents thereof) for receiving the amplified optical signal from the output end of the means for amplifying into a first end of the non-circular waveguide means for delivering; means (as described herein and equivalents thereof) for interfacing the non-circular waveguide means for delivering to the means for amplifying; means (as described herein and equivalents thereof) for outputting the amplified optical signal from a second end of the non-circular waveguide means for delivering; and means (as described herein and equivalents thereof) for inhibiting light traveling in a backward-propagating direction in the non-circular waveguide means for delivering from entering the means for amplifying in the backward-propagating direction.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
    amplifying an optical signal in an optical-gain-fiber subsystem of a laser system, wherein the optical-gain-fiber subsystem includes an output end;
    outputting the amplified optical signal in a forward-propagating direction from the output end of the optical-gain-fiber subsystem;
    receiving the amplified optical signal from the output end of the optical-gain-fiber subsystem into a first end of a delivery fiber;
    outputting the amplified optical signal from a second end of the delivery fiber; and
    without the use of a non-linear optical isolator, inhibiting light traveling in a backward-propagating direction in the delivery fiber from entering the optical-gain-fiber subsystem in the backward-propagating direction, wherein the inhibiting includes tilting an optical axis of the first end of the delivery fiber relative to a light-propagation axis of the amplified optical signal exiting the optical-gain-fiber subsystem such that a non-zero angle is formed between the tilted optical axis of the first end and the light-propagation axis of the amplified optical signal.

2. The method of claim 1, further comprising:
    providing a reverse endcap on the first end of the delivery fiber, wherein the reverse endcap further degrades the light traveling in the backward-propagating direction and thus further reduces the backward-traveling light that enters the optical-gain-fiber subsystem.

3. The method of claim 1, further comprising:
    providing a first lens and a second lens;
    optically coupling the first lens to the output end of the optical-gain-fiber subsystem, optically coupling the second lens to the first end of the delivery fiber, and optically coupling the first lens to the second lens, wherein the optically coupling of the first lens to the second lens includes separating the first lens from the second lens by a first distance such that the light traveling in the backward-propagating direction diverges and overfills the first lens;
    collimating the forward-propagating optical signal from the optical-gain-fiber subsystem using the first lens; and
    receiving the collimated forward-propagating optical signal from the first lens and focusing the forward-propagating optical signal using the second lens such that the forward-propagating optical signal enters the first end of the delivery fiber.

4. The method of claim 1, further comprising:
    providing a first lens and a second lens;
    optically coupling the first lens to the output end of the optical-gain-fiber subsystem, optically coupling the second lens to the first end of the delivery fiber, and optically coupling the first lens to the second lens;
    reflecting the forward-propagating optical signal a plurality of times and reflecting the light traveling in the backward-propagating direction a plurality of times in order to increase a distance the forward-propagating optical signal and the light traveling in the backward-propagating direction travel between the first lens and the second lens.

5. The method of claim 1, further comprising:
    mode mixing the forward-propagating light in the delivery fiber by a geometry of the delivery fiber.

6. The method of claim 1, wherein the inhibiting of light traveling in the backward-propagating direction further includes offsetting the light-propagation axis of the amplified optical signal relative to the optical axis of the first end of the delivery fiber such that a majority of the light traveling in the backward-propagating direction from the delivery fiber does not enter a core of the optical-gain-fiber subsystem.

7. The method of claim 1, surrounding a waveguide core of the delivery fiber with a photonic-crystal layer and surrounding the photonic-crystal layer with a cladding layer.

8. The method of claim 1, further comprising connectorizing the delivery fiber.

9. The method of claim 1, further comprising:
    tapping the forward-propagating light to obtain a forward-tap signal;
    tapping the backward-propagating light to obtain a backward-tap signal; and
    controlling operation of the laser system based on the forward-tap signal and the backward-tap signal.

10. An apparatus comprising:
    an optical-fiber amplifier subsystem configured to amplify an optical signal, wherein the optical-fiber amplifier subsystem includes an output end, and wherein the output end of the optical-fiber amplifier subsystem is configured to output the amplified optical signal in a forward-propagating direction; and
    a delivery fiber that has an interface to the optical-fiber amplifier subsystem and that has a first end and a second end, wherein the delivery fiber is configured to receive the optical signal from the output end of the optical-fiber amplifier subsystem into the first end of the delivery fiber, wherein the delivery fiber is configured to output the optical signal from the second end of the delivery fiber, and wherein an optical axis of the first end of the delivery fiber is tilted relative to a light-propagation axis of the amplified optical signal exiting the optical-fiber amplifier subsystem such that a non-zero angle is formed between the titled optical axis of the first end and the light-propagation axis of the amplified optical signal and such that light traveling in a backward-propagating direction in the delivery fiber is inhibited from entering the optical-fiber amplifier subsystem.

11. The apparatus of claim 10, further comprising a reverse endcap located between the output end of the optical-fiber amplifier subsystem and the first end of the delivery fiber, wherein the reverse endcap is configured to further degrade the light traveling in the backward-propagating direction and thus further reduce the backward-traveling light that enters the optical-fiber amplifier subsystem.

12. The apparatus of claim 10, further comprising:
    a first lens optically coupled to the output end of the optical-fiber amplifier subsystem, wherein the first lens is configured to substantially collimate the forward-propagating optical signal from the optical-fiber amplifier subsystem; and a second lens optically coupled to the first end of the delivery fiber, wherein the second lens is configured to receive the collimated forward-propagating optical signal from the first lens and to focus the forward-propagating optical signal such that the forward-propagating optical signal enters the first end of the delivery fiber.

13. The apparatus of claim 10, further comprising:
a first lens optically coupled to the output end of the optical-fiber amplifier subsystem;
a second lens optically coupled to the first end of the delivery fiber and optically coupled to the first lens; and
at least one reflecting optical element located between the first lens and the second lens, wherein the at least one reflecting optical element is configured to reflect the forward-propagating optical signal a plurality of times and to reflect the light traveling in the backward-propagating direction a plurality of times in order to increase a distance the forward-propagating optical signal and the light traveling in the backward-propagating direction travel between the first lens and the second lens.

14. The apparatus of claim 10, wherein the delivery fiber includes a non-circular waveguide core.

15. The apparatus of claim 10, wherein the light-propagation axis of the amplified optical signal and the optical axis of the first end of the delivery fiber are offset relative to one another such that a majority of the light traveling in the backward-propagating direction from the delivery fiber does not enter a core of the optical-fiber amplifier subsystem.

16. The apparatus of claim 10, wherein a waveguide core of the delivery fiber is surrounded by a photonic-crystal layer, and wherein the photonic-crystal layer is surrounded by a cladding layer.

17. The apparatus of claim 10, wherein the delivery fiber includes a non-circular waveguide core surrounded by a photonic-crystal layer, and wherein the non-circular waveguide core includes a mask having an offset light-entry aperture such that a majority of the light traveling in the backward-propagating direction from the first end of the delivery fiber is blocked by the mask and does not enter a core of the optical-fiber amplifier subsystem.

18. The apparatus of claim 10, further comprising a connector that includes a cylindrical hole that extends from a first end of the connector to a second end of the connector, wherein the connector is configured to receive the delivery fiber.

19. The apparatus of claim 10, further comprising a feedback-isolation-and-adaptor unit, wherein the feedback-isolation-and-adapter unit is connected between the optical-gain-fiber subsystem and the delivery fiber such that the output end of the optical-gain-fiber subsystem is optically coupled to an input ferrule of the feedback-isolation-and-adapter unit and such that an output ferrule of the feedback-isolation-and-adapter unit is optically coupled to the first end of the delivery fiber, wherein the feedback-isolation-and-adapter unit includes a forward-propagating-light tap and a backward-propagating-light tap.

20. An apparatus comprising:
means for amplifying an optical signal, the means for amplifying having an output end;
means for outputting the amplified optical signal in a forward-propagating direction from the output end;
a delivery fiber configured to deliver the amplified optical signal;
means for receiving the amplified optical signal from the output end of the means for amplifying into a first end of the delivery fiber;
means for interfacing the delivery fiber to the means for amplifying;
means for outputting the amplified optical signal from a second end of the delivery fiber; and
means for forming a non-zero angle between an optical axis of the first end of the delivery fiber and a light-propagation axis of the amplified optical signal exiting the means for amplifying such that light traveling in a backward-propagating direction in the delivery fiber is inhibited from entering the means for amplifying.

\* \* \* \* \*